United States Patent
Modanwal et al.

(10) Patent No.: US 12,530,770 B2
(45) Date of Patent: Jan. 20, 2026

(54) DEEP-LEARNING-BASED HEPATIC FAT ASSESSMENT

(71) Applicants: Case Western Reserve University, Cleveland, OH (US); Emory University, Atlanta, GA (US); University Hospitals Cleveland Medical Center, Cleveland, OH (US)

(72) Inventors: Gourav Modanwal, Cleveland, OH (US); Sadeer Al-Kindi, Cleveland, OH (US); Jonathan Walker, Cleveland, OH (US); Rohan Dhamdhere, Atlanta, GA (US); Sanjay Rajagopalan, Cleveland, OH (US); Anant Madabhushi, Decatur, GA (US)

(73) Assignees: Case Western Reserve University, Cleveland, OH (US); Emory University, Atlanta, GA (US); University Hospitals Cleveland Medical Center, Cleveland, OH (US)

( * ) Notice: Subject to any disclaimer, the term of this patent is extended or adjusted under 35 U.S.C. 154(b) by 284 days.

(21) Appl. No.: 18/461,686

(22) Filed: Sep. 6, 2023

(65) Prior Publication Data

US 2024/0420320 A1    Dec. 19, 2024

Related U.S. Application Data

(60) Provisional application No. 63/508,310, filed on Jun. 15, 2023.

(51) Int. Cl.
*G06T 7/00* (2017.01)
*A61B 5/00* (2006.01)
(Continued)

(52) U.S. Cl.
CPC .......... *G06T 7/0012* (2013.01); *A61B 5/0033* (2013.01); *A61B 5/0073* (2013.01);
(Continued)

(58) Field of Classification Search
CPC .............. G06T 7/0012; G06T 7/11; G06T 2207/10081; G06T 2207/20081;
(Continued)

(56) References Cited

U.S. PATENT DOCUMENTS 11,227,683 B2 *  1/2022  Morard .................. G06T 7/174
12,315,147 B2 *  5/2025  Rexhepaj ................. G06T 7/11
(Continued)

OTHER PUBLICATIONS

Huo, Yuankai, et al. "Fully automatic liver attenuation estimation combing CNN segmentation and morphological operations." Medical physics 46(8), pp. 3508-3519 (Year: 2019).*
(Continued)

*Primary Examiner* — Scott A Rogers
(74) *Attorney, Agent, or Firm* — Eschweiler & Potashnik, LLC

(57) ABSTRACT

The present disclosure relates to a method. The method includes accessing automatically segmented liver data and automatically segmented spleen data from a patient. The automatically segmented liver data is used to determine a liver attenuation and the automatically segmented spleen data is used to determine a spleen attenuation. A liver-to-spleen attenuation ratio is determined from the liver attenuation and the spleen attenuation. A hepatic steatosis determination is made from the liver-to-spleen attenuation ratio.

20 Claims, 11 Drawing Sheets

(51) Int. Cl.
*G06T 7/11* (2017.01)
*G16H 50/30* (2018.01)

(52) U.S. Cl.
CPC ............ *A61B 5/416* (2013.01); *A61B 5/4244* (2013.01); *G06T 7/11* (2017.01); *G06T 2207/10081* (2013.01); *G06T 2207/20081* (2013.01); *G06T 2207/20084* (2013.01); *G06T 2207/30056* (2013.01)

(58) Field of Classification Search
CPC ........... G06T 2207/20084; G06T 2207/30056; A61B 5/0033; A61B 5/0073; A61B 5/416; A61B 5/4244
See application file for complete search history.

(56) References Cited

U.S. PATENT DOCUMENTS

2018/0260957 A1* 9/2018 Yang ..................... G06T 7/143
2025/0272837 A1* 8/2025 Rexhepaj .............. G06T 7/0012

OTHER PUBLICATIONS

Jang, Weon, and Ji Soo Song. "Non-invasive imaging methods to evaluate non-alcoholic fatty liver disease with fat quantification: a review." Diagnostics 13(11), 1852 (Year: 2023).*

Jeon, Sun Kyung, et al. "Automated hepatic steatosis assessment on dual-energy CT-derived virtual non-contrast images through fully-automated 3D organ segmentation." La radiologia medica 129(7), pp. 967-976 (Year: 2024).*

Johnston, R. J., et al. "Diagnosis of fatty infiltration of the liver on contrast enhanced CT: limitations of liver-minus-spleen attenuation difference measurements." Abdominal imaging 23(4), pp. 409-415. (Year: 1998).*

Kim, Jong Man, et al. "Predicting hepatic steatosis in living liver donors via noninvasive methods." Medicine 95(7), pp. 1-7 (Year: 2016).*

Kodama, Yoshihisa, et al. "Comparison of CT methods for determining the fat content of the liver." American Journal of Roentgenology 188(5), pp. 1307-1312 (Year: 2007).*

Lăpădat, A. M., et al. "Non-invasive imaging techniques in assessing non-alcoholic fatty liver disease: a current status of available methods." Journal of medicine and life 10(1), pp. 19-26 (Year: 2017).*

Rogier, Julien, et al. "Noninvasive assessment of macrovesicular liver steatosis in cadaveric donors based on computed tomography liver-to-spleen attenuation ratio." Liver Transplantation 21(5), pp. 690-695 (Year: 2015).*

Yoo, Jeongin, et al. "Utilizing fully-automated 3D organ segmentation for hepatic steatosis assessment with CT attenuation-based parameters." European Radiology 34(9), pp. 6205-6213 (Year: 2024).*

Zhang, Zhongyi, et al. "Fully Automated Deep Learning-enabled Detection for Hepatic Steatosis on Computed Tomography: A Multicenter International Validation Study." arXiv preprint arXiv:2210.15149 (Year: 2022).*

* cited by examiner

| Segmentation Methods | Acc. | Prec. | Recall | DSC | CT Attenuation Measurement Methods | Liver | | Liver-to-spleen | |
|---|---|---|---|---|---|---|---|---|---|
| | | | | | | ρ | P-value | ρ | P-value |
| Manual Segmentation | - | - | - | - | Slice-based | 0.97 | P<0.001 | 0.94 | P<0.001 |
| | | | | | Volumetric based | 0.93 | P<0.001 | 0.89 | P<0.001 |
| nnUnet(30) | 0.97 | 0.95 | 0.95 | 0.95 | Slice-based | 0.98 | P<0.001 | 0.95 | P<0.001 |
| | | | | | Volumetric based | 0.96 | P<0.001 | 0.92 | P<0.001 |

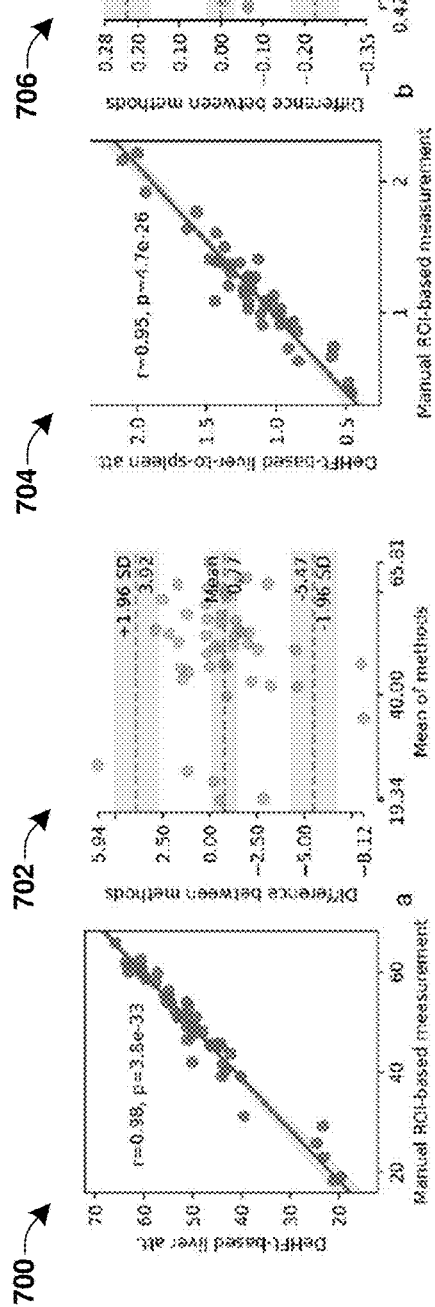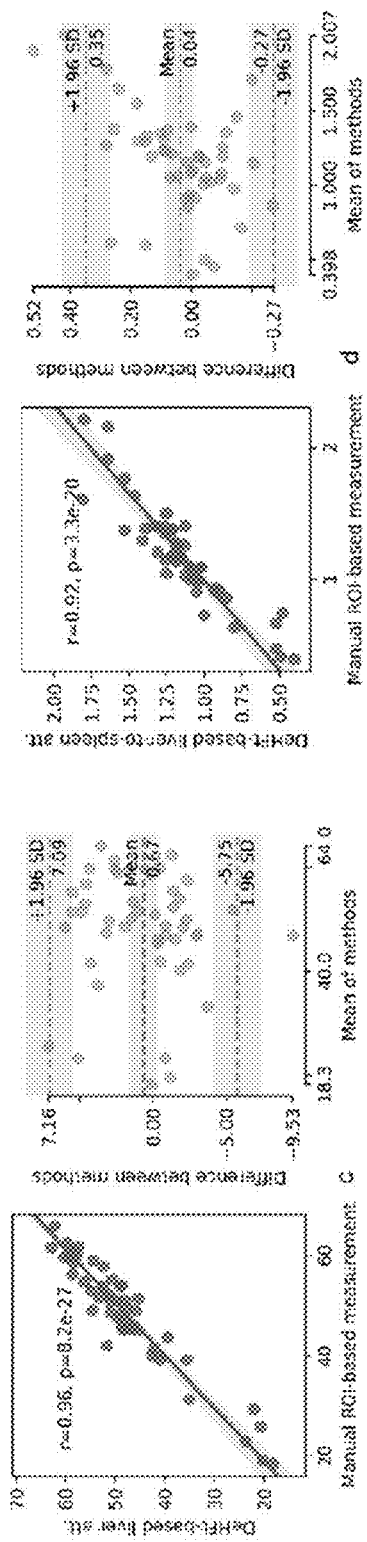
Fig. 7A  Fig. 7B  Fig. 7C  Fig. 7D

DEEP-LEARNING-BASED HEPATIC FAT ASSESSMENT

REFERENCE TO RELATED APPLICATION

This Application claims the benefit of U.S. Provisional Application No. 63/508,310, filed on Jun. 15, 2023, the contents of which are hereby incorporated by reference in their entirety.

FEDERAL FUNDING NOTICE

This invention was made with government support under CA202752, CA208236, CA216579, CA220581, CA239055, CA248226, CA249992, CA254566, CA257612, CA268207, CA268287, CA269181, EB028736, HL151277, HL158071, and RR012463 awarded by the National Institutes of Health; W81XWH-18-1-0404, W81XWH-18-1-0440, W81XWH-19-1-0668, W81XWH-21-1-0160, and W81XWH-21-1-0345 awarded by the Department of Defense; and IBX004121A awarded by the Department of Veterans Affairs. The government has certain rights in the invention.

BACKGROUND

Machine learning is a type of artificial intelligence that allows computers to gradually improve their performance of a task through training. Deep learning is a subfield of machine learning where computers learn with the help of layered neural networks (e.g., convolutional neural networks). Deep learning models have shown great promise in medical applications, such as analysis of medical images.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

FIGS. 7A-7D illustrate some embodiments of scatter plots and Bland Altman graphs showing variability in attenuation measurements achieved by the disclosed deep learning pipeline and manual measurements.

DETAILED DESCRIPTION

Figure 1:
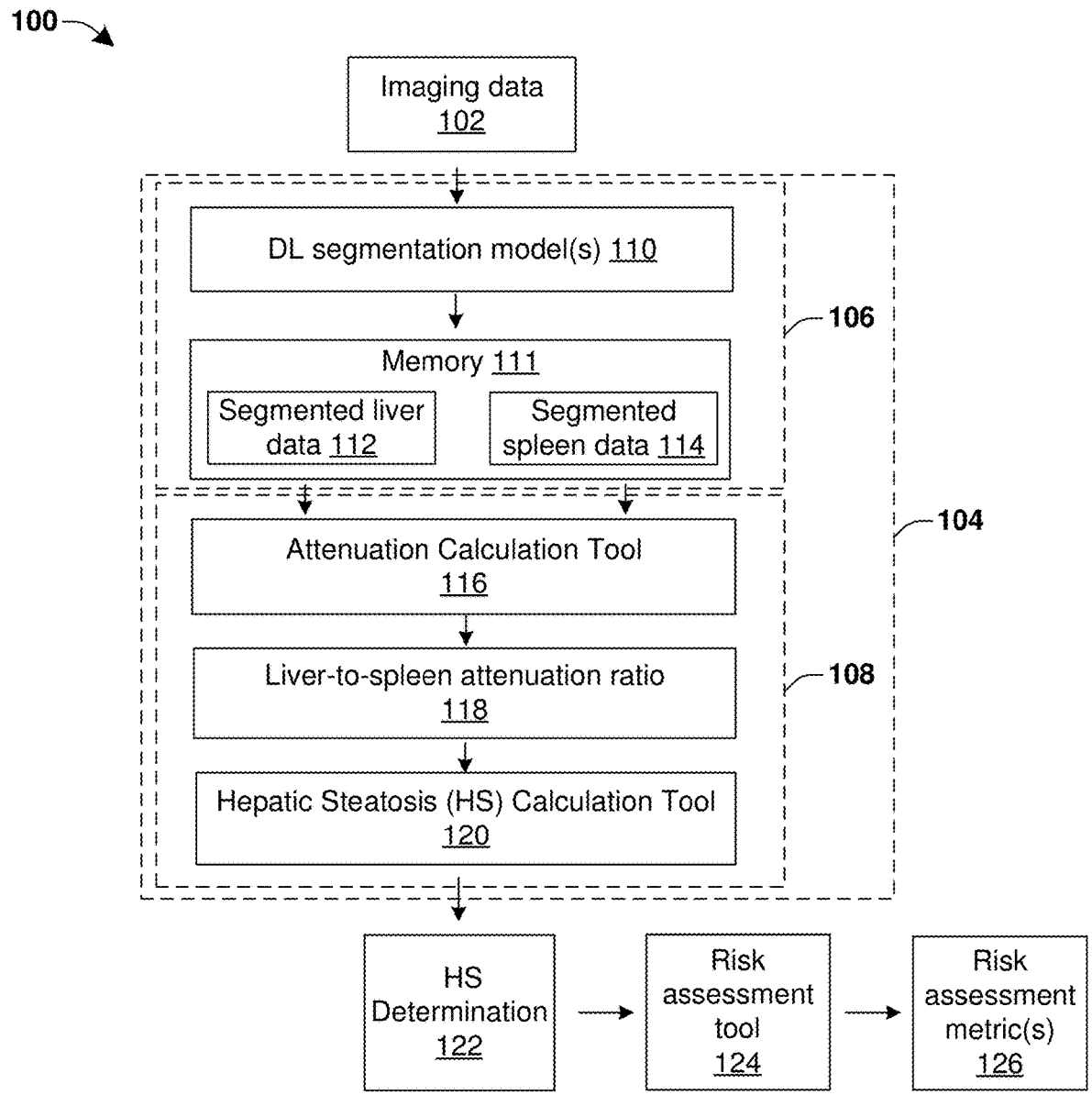
FIG. 1 illustrates a block diagram of some embodiments of a medical diagnostic tool comprising a deep-learning hepatic fat pipeline configured to automatically generate a hepatic steatosis determination from one or more digitized images.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

Obesity and prediabetes affect a significant proportion of the American population (e.g., an estimated 90 million individuals), placing them at higher a likelihood of cardiovascular and/or cardiometabolic risk (e.g., including type 2 diabetes and its progression). As a chronic condition posing the highest risk for cardiovascular disease, type 2 diabetes presents both a challenge and an opportunity for preventive approaches.

Hepatic steatosis, also referred to as fatty liver disease, is a condition characterized by extra fat in a patient's liver. It has been appreciated that hepatic steatosis is a surrogate marker for cardiometabolic risk. A liver biopsy is the gold standard for assessing liver fat content and diagnosing hepatic steatosis. However, it is not widely used due to its invasive nature and high cost. MRI proton density fat fraction (PDFF) is a noninvasive technique that is able to provide reasonable results for estimating the presence and grading of hepatic steatosis. However, MRI PDFF is not widely available and thus cannot provide for widespread diagnosis of hepatic steatosis.

Other imaging techniques have found limited success in diagnosing hepatic steatosis. For example, hepatic steatosis is not routinely assessed on coronary artery calcium (CAC) computed tomography (CT) images. This is because of difficulty in achieving accurate manual delineation of regions of interest (ROI), inter-reader variability in measurements, lack of consensus on measurement methodology, and spatial heterogeneity in liver attenuation. These problems are especially pertinent in low-dose non-contrast CTs due to signal heterogeneity, lack of border contrast, and partial liver imaging.

The present disclosure relates to a method and apparatus configured to automatically generate a hepatic steatosis determination from a digitized image (e.g., a CT image) using a deep learning pipeline. In some embodiments, the method may comprise using one or more deep learning models to generate automatically segmented liver data and automatically segmented spleen data from one or more digitized images (e.g., non-contrast CT scans) of a patient. The automatically segmented liver data is used to determine a liver attenuation and the automatically segmented spleen data is used to determine a spleen attenuation. A liver-to-spleen attenuation ratio is determined from the liver attenuation and the spleen attenuation. Hepatic steatosis may be identified using the liver-to-spleen attenuation ratio. By using automatically segmented liver and spleen data to determine a liver-to-spleen attenuation ratio, the disclosed method and apparatus is able to reduce inter-reader variability in measurements, thereby providing for accurate and reproducible hepatic steatosis determinations in patients. Furthermore, by generating automatically segmented liver and spleen data using one or more deep learning models, the hepatic steatosis determination can be achieved in a short time (e.g., the disclosed deep learning model can segment the liver and spleen for each patient in approximately 1 minute) allowing it to be used to make further assessments of one or more medical risks (e.g., for cardiometabolic disease, COVID-19 severity, etc.)

FIG. 1 illustrates a block diagram of some embodiments of a medical diagnostic tool 100 comprising a deep learning hepatic fat pipeline configured to automatically generate a hepatic steatosis determination from one or more digitized images.

The medical diagnostic tool 100 comprises a deep learning hepatic fat pipeline 104 that is configured to access imaging data 102 corresponding to a patient. The imaging data 102 comprises one or more digitized images, which include imaging data from a liver and a spleen of the patient. In some embodiments, the one or more digitized images comprise one or more low-dose non-contrast computed tomography (CT) images. The deep learning hepatic fat pipeline 104 is configured to use the imaging data 102 to generate a hepatic steatosis determination 122 corresponding to the patient.

In some embodiments, the deep learning hepatic fat pipeline may comprise a first stage 106 and/or a second stage 108. The first stage 106 includes one or more deep learning segmentation models 110 configured to operate upon the imaging data 102. The one or more deep learning segmentation models 110 are configured to segment the imaging data 102 to generate automatically segmented liver data 112 identifying a segmented liver. The automatically segmented liver data 112 comprises or is a region of interest (ROI) from a digitized image of a liver. The one or more deep learning segmentation models 110 are also configured to segment the imaging data 102 to generate automatically segmented spleen data 114 identifying a segmented spleen. The automatically segmented spleen data 114 comprises or is a region of interest (ROI) from a digitized image of a spleen. In some embodiments, the automatically segmented liver data 112 and the automatically segmented spleen data 114 may be stored in electronic memory 111.

The second stage 108 is configured to access the automatically segmented liver data 112 and the automatically segmented spleen data 114. The second stage 108 includes an attenuation calculation tool 116 that is configured to use the automatically segmented liver data 112 and the automatically segmented spleen data 114 to measure a liver-to-spleen attenuation ratio 118. The second stage 108 further comprises a hepatic steatosis (HS) calculation tool 120 that is configured to generate the hepatic steatosis determination 122 using the liver-to-spleen attenuation ratio 118.

In some embodiments, the attenuation calculation tool 116 may measure the liver-to-spleen attenuation ratio 118 by measuring attenuation values within the segmented liver and the segmented spleen. Since the attenuation values are indicative of fat in a liver, the HS calculation tool 120 can use the resulting liver-to-spleen attenuation ratio 118 to generate the hepatic steatosis determination 122. For example, a healthy liver will have an attenuation that is similar to that of a spleen, resulting in a liver-to-spleen attenuation ratio 118 that is greater than or equal to approximately 1. However, it has been appreciated that fat within a liver will increase attenuation within the liver (e.g., fat within a liver will absorb more electromagnetic energy). Therefore, a fatty liver will attenuate the energy of an x-ray faster than a healthy liver, so that the fatty liver provides a lower attenuation value and thus a liver-to-spleen attenuation ratio 118 that is less than 1.

In some embodiments, a risk assessment tool 124 is configured to use the hepatic steatosis determination 122 to generate one or more risk assessment metrics 126 that are indicative of one or more health determinations about the patient. In some embodiments, the risk assessment tool 124 may use the hepatic steatosis determination 122 to generate one or more risk assessment metrics 126 that identify cardiometabolic risk (e.g., to identify patients that are at a high risk for metabolic disease). In other embodiments, the risk assessment tool 124 may use the hepatic steatosis determination 122 to generate one or more risk assessment metrics 126 corresponding to a severity of COVID symptoms that a patient may experience due to a COVID infection (e.g., an infection by the COVID-19 virus or a variant thereof). The one or more risk assessment metrics 126 can be used to guide treatment of the patient. For example, the one or more risk assessment metrics 126 can be used to aid in assigning a care level (e.g., inpatient vs outpatient) and/or a decision for early use of therapeutics (e.g., antivirals) in a patient having contracted COVID-19.

Therefore, the disclosed deep learning hepatic fat pipeline 104 enables an automated assessment of hepatic steatosis in clinical practice that provides for a higher degree of standardized and reproduceable measurements than that achievable by humans. The higher degree of standardized measurements allows for the medical diagnostic tool 100 to generate accurate risk assessment metrics that can aid in treatment of a patient, thereby leading to improved health care for the patient.

Figure 2:
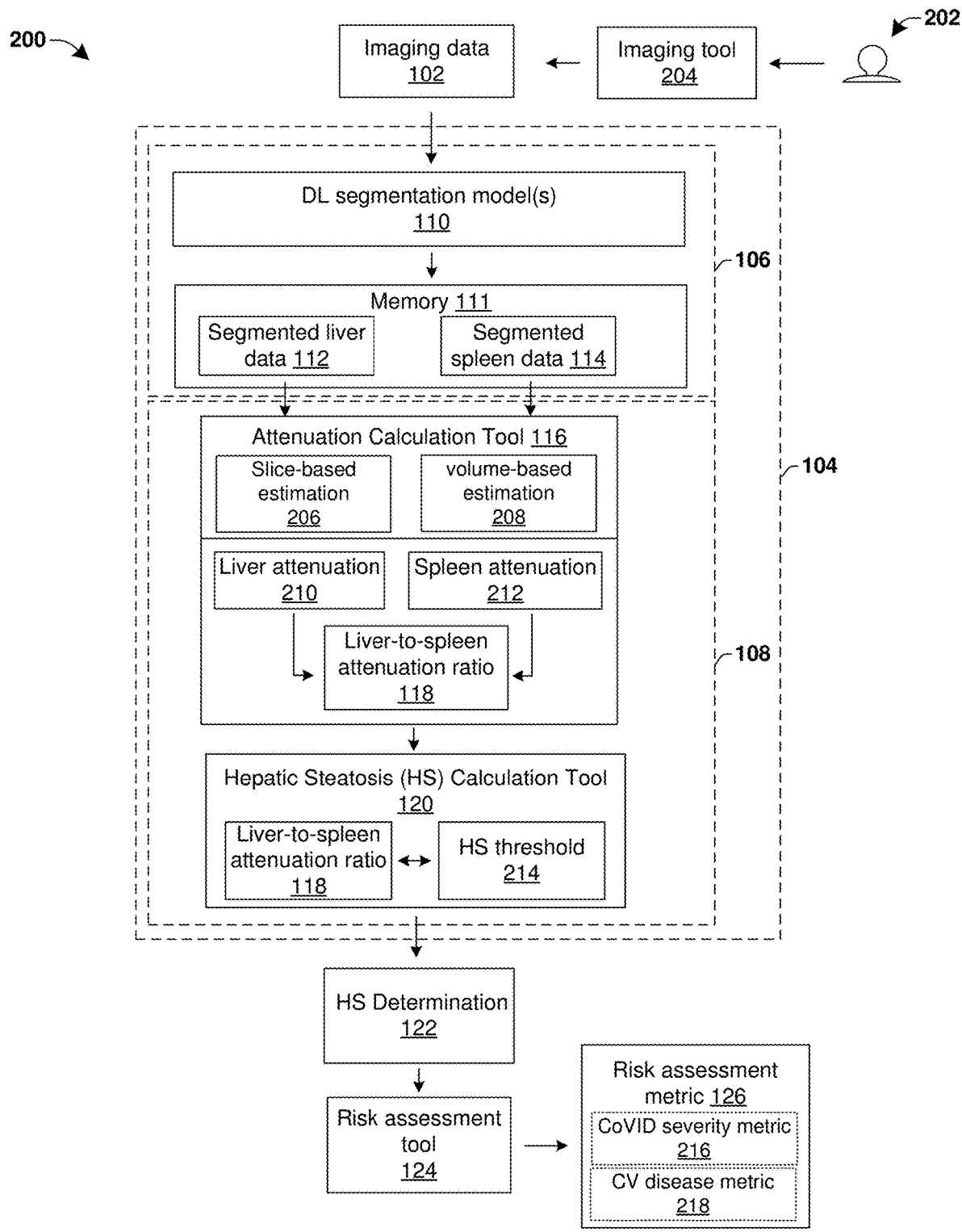
FIG. 2 illustrates a block diagram of some additional embodiments of a medical diagnostic tool comprising a disclosed deep learning hepatic fat pipeline.

FIG. 2 illustrates a block diagram of some additional embodiments of a medical diagnostic tool 200 comprising a disclosed deep learning hepatic fat pipeline.

The medical diagnostic tool 200 comprises a deep learning hepatic fat pipeline 104 having a first stage 106 and a second stage 108 downstream of the first stage 106. The first stage 106 includes one or more deep learning segmentation models 110 configured to segment imaging data 102 to generate automatically segmented liver data 112 and automatically segmented spleen data 114. In some embodiments, the one or more deep learning segmentation models 110 are configured to generate one or more binary masks that comprise the automatically segmented liver data 112 and/or automatically segmented spleen data 114. In some such embodiments, the one or more binary masks comprise images having a value of "1" in image units (e.g., pixels, voxels, etc.) identified as being within a liver and/or spleen and having a value of "0" in image units outside of the liver and/or spleen.

In some embodiments, the imaging data 102 may comprise one or more digitized images including a liver and a spleen. The imaging data 102 may include a plurality of image units (e.g., pixels, voxels, etc.) respectively having an intensity. In some embodiments, the imaging data 102 may comprise CT images. In some additional embodiments, the imaging data 102 may comprise low-dose non-contrast CTs, such as coronary artery calcium (CAC) scans, for example. In some such embodiments, the CT image may not include an entire liver and/or spleen. In some embodiments, the imaging data 102 may comprise a volume of images including a stack of 2D images that collective form a 3D image.

In some embodiments, the imaging data 102 may be obtained by operating upon a patient 202 using an imaging tool 204. In some embodiments, the imaging tool 204 may comprise a computed tomography (CT) scanner configured to generate one or more digitized images comprising CT images. In other embodiments, the imaging tool 204 may comprise a magnetic resonance enterography (MRE) scanner configured to generate MRE images, a computed tomography enterography (CTE) scanner configured to generate CTE images, or the like.

In some embodiments, the one or more deep learning segmentation models 110 comprise a single deep learning model that is configured to segment imaging data of both a liver and a spleen. In other embodiments, the one or more deep learning segmentation models 110 comprise a first deep learning model that segments imaging data of a liver and a second deep learning model that segments imaging data of a spleen. In some embodiments, the one or more deep learning segmentation models 110 may comprise a 3D residual-UNet architecture from a nnUnet framework. In other embodiments, the one or more deep learning segmentation models 110 may comprise a Unet2D model, a FPN (Feature Pyramid Network) model, a LinkNet model, and/or the like. In some embodiments, the one or more deep learning segmentation models 110 were able to achieve a dice similarity coefficients (DSCs) of approximately 0.95, 95% CI (confidence interval), in comparison with ground truths obtained by manual segmentations performed by experts, thereby showing good overlap between the automated segmentation of the one or more deep learning segmentation models 110 and manual expert segmentation.

The deep learning hepatic fat pipeline 104 further comprises a second stage 108 that is configured to utilize the automatically segmented liver data 112 and the automatically segmented spleen data 114 to generate a hepatic steatosis determination 122 for the patient 202. In some embodiments, the second stage 108 comprises an attenuation calculation tool 116 that is configured to utilize the automatically segmented liver data 112 and the automatically segmented spleen data 114 to determine a liver-to-spleen attenuation ratio 118. In some embodiments, the attenuation calculation tool 116 is configured to utilize the automatically segmented liver data 112 to measure a liver attenuation 210, to utilize the automatically segmented spleen data 114 to measure a spleen attenuation 212, and to determine the liver-to-spleen attenuation ratio 118 from the liver attenuation 210 and the spleen attenuation 212.

For example, in some embodiments the attenuation calculation tool 116 may determine the liver-to-spleen attenuation ratio 118 by measuring the liver attenuation 210 as a mean value of Hounsfield units (HUs) over an entire liver identified through segmentation (e.g., over image units having a value denoting a liver within a binary mask). The attenuation calculation tool 116 may also measure the spleen attenuation 212 as a mean value of HUs over an entire spleen identified through segmentation (e.g., over image units having a value denoting a spleen within a binary mask). The attenuation calculation tool 116 may then determine the liver-to-spleen attenuation ratio 118 by dividing the liver attenuation 210 (mean value of HUs over the entire liver) by the spleen attenuation 212 (mean value of HUs over the entire spleen). By measuring a mean value of HUs over an entire liver and/or spleen, the disclosed attenuation calculation tool 116 is able to measure a liver attenuation and a spleen attenuation with a greater accuracy than manual methods (e.g., methods that measure mean HU values over one or more regions of interest (ROI) within a part, but not all, of a liver and/or a spleen)

In some embodiments, the attenuation calculation tool 116 is configured to utilize a slice-based estimation method 206 to automatically measure attenuation and determine the liver-to-spleen attenuation ratio 118. In such embodiments, the liver-to-spleen attenuation ratio 118 is determined by identifying a slice of a digitized image with a maximum area (e.g., a maximum liver and/or spleen area) and obtaining a mean attenuation and/or standard deviation for HU values of an entire liver and an entire spleen within the slice. In other embodiments, the attenuation calculation tool 116 is configured to utilize a volume-based estimation 208 to automatically measure attenuation and determine the liver-to-spleen attenuation ratio 118. In such embodiments, the liver-to-spleen attenuation ratio 118 is determined by obtaining a mean attenuation and/or standard deviation for HU values across a whole liver and a whole spleen over a three-dimensional image volume (e.g., over a stack of 2D slices).

A hepatic steatosis (HS) calculation tool 120 is configured to compare the liver-to-spleen attenuation ratio 118 to a hepatic steatosis threshold 214 to generate the hepatic steatosis determination 122. For example, in some embodiments, the HS calculation tool 120 is configured to generate a hepatic steatosis determination 122 that is positive if a liver-to-spleen attenuation ratio 118 is less than a hepatic steatosis threshold 214 having a value of approximately 1 in CT, less than approximately 0.9 in CT, or other similar values. In some embodiments, the attenuation calculation tool 116 and/or the HS calculation tool 120 may comprise circuits and/or code run on a processor (e.g., C+ code, python code, etc.).

In some embodiments, a risk assessment tool 124 may utilize the hepatic steatosis determination 122 to determine one or more risk assessment metrics 126. In some embodiments, the one or more risk assessment metrics 126 may comprise a COVID severity metric 216, which indicates a prediction of how the patient 202 will respond to the COVID-19 virus. In such embodiments, COVID severity metric 216 can be used to help assign a care level (e.g., inpatient vs outpatient) and/or make a decision for early use of therapeutics (e.g., antivirals). In other embodiments, the one or more risk assessment metrics 126 may comprise a cardiovascular disease metric 218, which indicates a likelihood that the patient 202 will develop cardiovascular disease (e.g., type 2 diabetes).

Figure 3A:
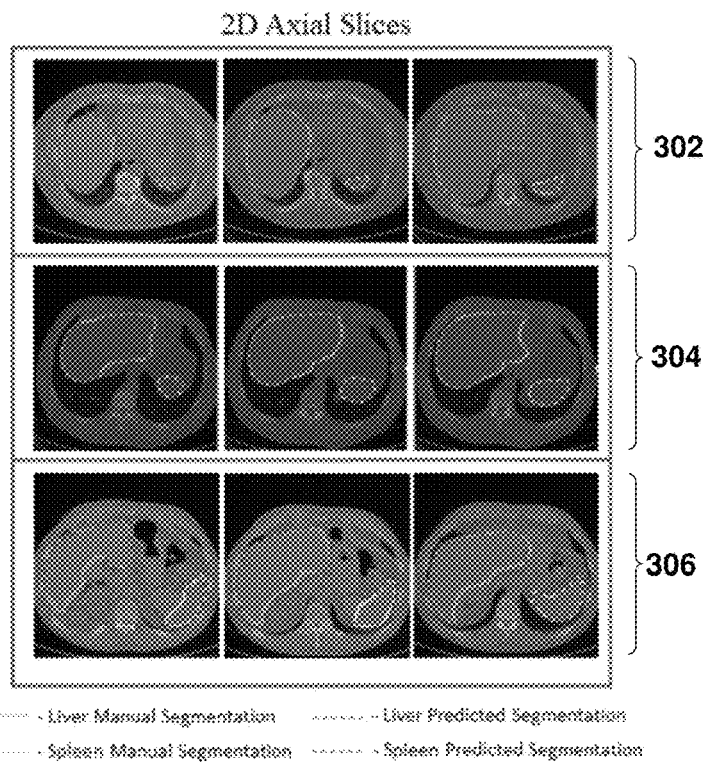
FIGS. 3A-3B illustrate examples of digitized images showing liver and spleen segmentations having different dice similarity coefficients (DSCs) achieved using slice-based estimations and volume-based estimations.

FIG. 3A illustrates examples of digitized images 300 showing liver and spleen segmentations having different dice similarity coefficients (DSCs) achieved using slice-based estimations.

The digitized images 300 shown in FIG. 3A illustrate both manual and automated segmentations of a liver and of a spleen. The digitized images 300 are organized into a first group 302 having liver and spleen segmentations with the best dice similarity coefficients (DSCs), a second group 304 having liver and spleen segmentations with median DSCs, and a third group 306 having liver and spleen segmentations with lowest DSCs. In some embodiments, the first group 302 may have a DSC that is approximately equal to 0.9782, the second group 304 may have a DSC that is approximately equal to 0.9589, and the third group 306 may have a DSC that is approximately equal to 0.9136.

As can be seen in the first group 302, there is good agreement between the manual and automated liver and spleen segmentations (e.g., the green and red lines are nearly identical and the blue and yellow lines are nearly identical). The second group 304 shows more deviations between the manual and automated liver and spleen segmentations than the first group 302 (e.g., the green and red lines deviate by larger amounts than the first group 302). The third group 306 shows more deviations between the manual and automated liver and spleen segmentations than the second group 304 (e.g., the green and red lines and the blue and yellow lines deviate by larger amounts than the second group 304).

Figure 3B:
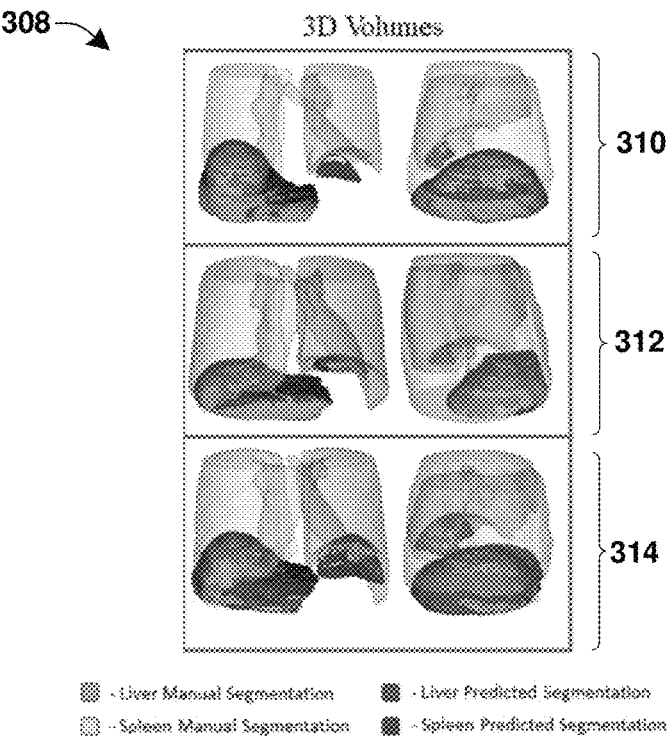

FIG. 3B illustrates examples of digitized images 308 that have been segmented to show liver and spleen segmentations having different DSCs achieved using volume-based estimations.

The digitized images 308 shown in FIG. 3B illustrate both manual and automated segmentations of a liver and of a spleen. The digitized images 308 are organized into a first group 310 having liver and spleen segmentations with the best DSCs (e.g., having a DSC of approximately 0.9782), a second group 312 having liver and spleen segmentations with median DSCs (e.g., having a DSC of approximately 0.9589), and a third group 314 having liver and spleen segmentations with lowest DSCs (e.g., having a DSC of approximately 0.9136). As can be seen in the first group 310, there is good agreement between the manual and automated liver and spleen segmentations. The second group 312 shows more deviations between the manual and automated liver and spleen segmentations than the first group 310. The third group 314 shows more deviations between the manual and automated liver and spleen segmentations than the second group 312.

Figure 4:
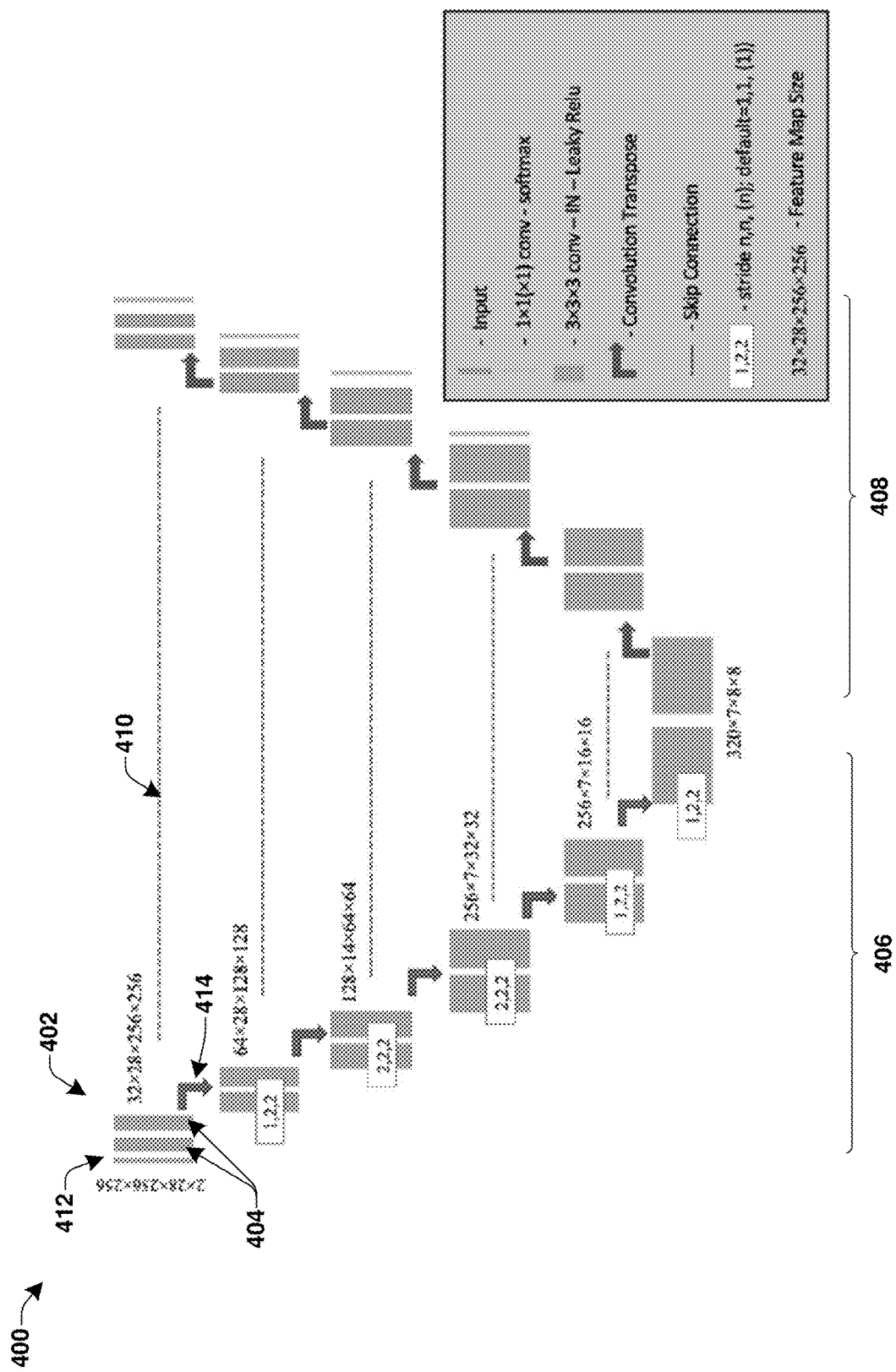
FIG. 4 illustrates a schematic representation of an exemplary 3D residual UNet architecture that may be used by one or more deep learning segmentation models within a disclosed deep learning hepatic fat pipeline.

FIG. 4 illustrates a schematic representation of an exemplary 3D residual UNet architecture 400 that may be used by one or more deep learning segmentation models within a disclosed deep learning hepatic fat pipeline.

The 3D residual UNet architecture 400 comprises a plurality of blocks 402 that respectively include convolutions and ReLU (e.g., leaky ReLU) 404. The plurality of blocks 402 are arranged symmetrically within an encoder part 406 and a decoder part 408 of the architecture. The plurality of blocks 402 within the encoder part 406 are configured to reduce spatial dimensions and increase channels. The plurality of blocks 402 within the decoder part 408 are configured to increase spatial dimensions and decrease channels. Skip connections 410 are present between corresponding blocks within the encoder part 406 and the decoder part 408.

Each of the plurality of blocks 402 is configured to receive an input 412 and to perform a first convolution and ReLU and a second convolution and ReLU on the input 412 to generate an output 414 that is provided as an input to a downstream block. In some embodiments, the first convolution and the second convolution may comprise 3×3×3 convolutions.

Figure 5:
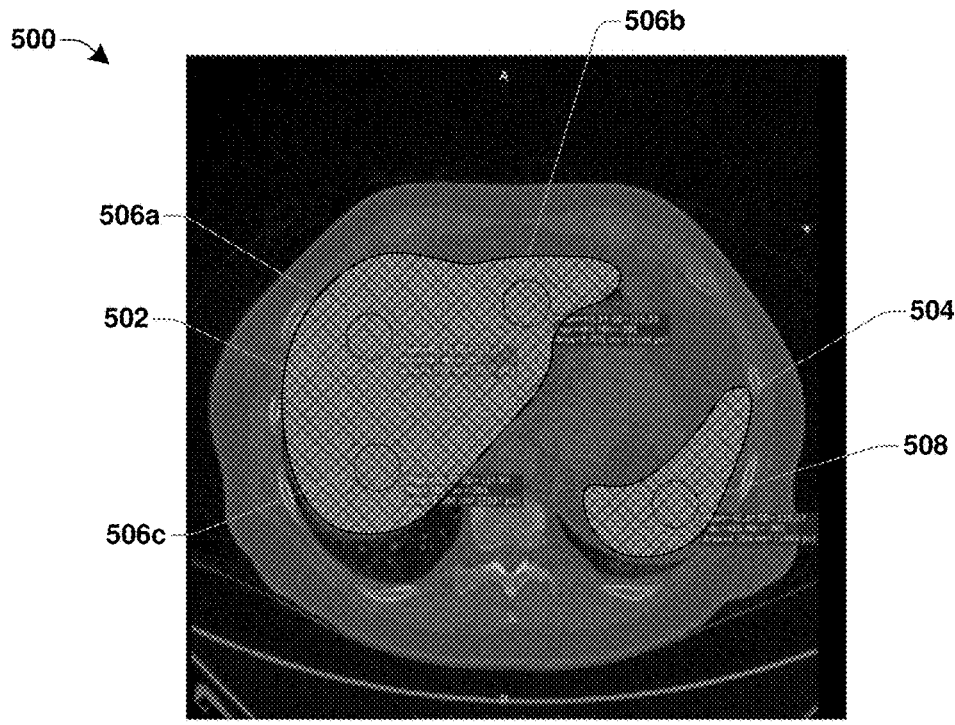
FIG. 5 illustrates an exemplary cross-sectional image of a body cavity with a liver and a spleen used to measure a liver-to-spleen attenuation ratio.

FIG. 5 illustrates an exemplary cross-sectional image 500 of an abdominal cavity showing a liver and a spleen used to measure a liver-to-spleen attenuation ratio.

Cross-sectional image 500 illustrates a liver 502 and a spleen 504. The liver 502 and the spleen 504 may be segmented by generating a binary mask that identified the liver 502 and the spleen 504 within the cross-sectional image 500. A disclosed attenuation calculation tool (e.g., attenuation calculation tool 116 of FIG. 2) is configured to measure a liver attenuation by determining a mean HU and/or a standard deviation of HU over an entirety of the liver 502 within the cross-sectional image 500. By measuring the mean HU and/or standard deviation of HU over the entirety of the liver 502, the disclosed attenuation measurement tool is able to measure liver attenuation more accurately than a manual method (e.g., which would measure mean HU within one or more ROI 506a-506c within the liver 502).

The disclosed attenuation measurement tool is also configured to measure a spleen attenuation by determining a mean HU and/or a standard deviation of HU over an entirety of the spleen 504 within the cross-sectional image 500. By measuring the mean HU and/or standard deviation of HU over the entirety of the spleen 504, the disclosed attenuation measurement tool is able to measure spleen attenuation more accurately than a manual method (e.g., which would measure mean HU within one or more ROI 508 within the spleen 504). The disclosed attenuation measurement tool is configured to determine a liver-to-spleen attenuation ratio by dividing the mean HU over the entire liver by the mean HU over the entire spleen.

Figure 6:
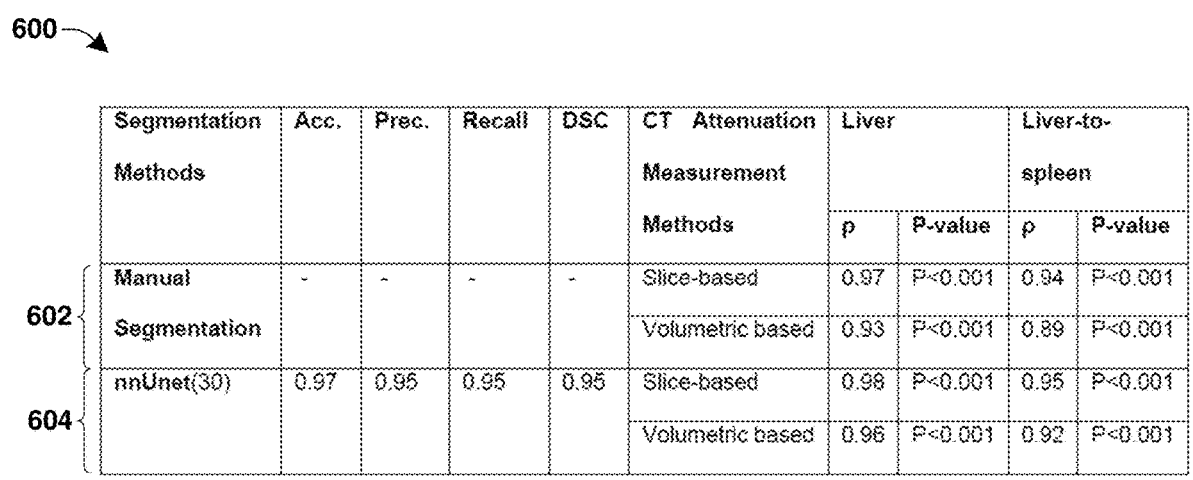
FIG. 6 illustrates a table showing exemplary performance metrics of different attenuation measurement methods for computer tomography (CT) images.

FIG. 6 illustrates a table 600 showing exemplary performance metrics of different attenuation measurement methods for computer tomography (CT) images.

Table 600 illustrates exemplary performance metrics of manual attenuation measurements 602 and automated attenuation estimates 604 achieved using the disclosed deep learning hepatic fat pipeline. Comparison of the manual attenuation measurements 602 with ground truth segmentation (e.g., performed manually by an expert pathologist) shows a strong correlation between slice-based liver and liver-to-spleen attenuation estimations with manual ROI-based measurements (e.g., comparisons achieved Pearson correlation coefficients of $\rho=0.97$ and $\rho=0.94$, respectively). Similarly, comparison of the manual attenuation measurements 602 with ground truth segmentation shows a strong correlation between volume-based liver and liver-to-spleen attenuation estimations with manual ROI-based measurements (e.g., comparisons achieved Pearson correlation coefficients of $\rho=0.93$ and $\rho=0.89$, respectively). The good agreement of manual attenuation measurements 602 with ground truth segmentation shows that the measurement of attenuation using slice-based and volume-based estimations is a viable method to measure attenuation.

The automated attenuation estimates 604 obtained using the disclosed deep learning hepatic fat pipeline also achieved good agreement with manual ROI based measurements for both slice-based and volume-based estimations of liver and liver-to-spleen attenuation. For example, comparison of the automated attenuation estimates 604 with ground truth segmentation shows a strong correlation between slice-based liver and liver-to-spleen attenuation estimations with manual ROI-based measurements (e.g., comparisons achieved Pearson correlation coefficients of $\rho=0.98$ and $\rho=0.95$). Similarly, comparison of the automated attenuation estimates 604 with ground truth segmentation shows a strong correlation between volume-based liver and liver-to-spleen attenuation estimations with manual ROI-based measurements (e.g., comparisons achieved Pearson correlation coefficients of $\rho=0.96$ and $\rho=0.92$, respectively). Therefore, the disclosed deep learning hepatic fat pipeline is able to accurately estimate CT attenuation in a liver and to accurate determine a liver-to-spleen ratio.

FIGS. 7A-7D illustrate some embodiments of scatter plots and Bland Altman graphs showing variability in attenuation measurements achieved by the disclosed deep learning pipeline and manual measurements. The scatter plots shown in FIGS. 7A-7D show a correlation between manual ROI based measurements performed by an expert and measurements generated by the disclosed deep learning pipeline. As can be seen in the scatter plots, the measurements generated by the disclosed deep learning pipeline strongly correlate with the manual ROI based measurements.

FIG. 7A illustrates some embodiments of a scatter plot 700 and a Bland Altman graph 702 showing variability in a slice-based liver attenuation estimation. In the Bland Altman graph 702, the dotted horizontal blue line shows the mean of the differences (e.g., the bias) between the two methods, and the doted red horizontal lines show the upper and lower 95% limits of agreement (e.g., bias±1.96×standard deviation). As can be seen by scatter plot 700 and Bland Altman graph 702, the slice-based automatic liver estimation achieved a Pearson correlation coefficient $\rho=0.98$.

FIG. 7B illustrates some embodiments of a scatter plot 704 and a Bland Altman graph 706 showing variability in a slice-based liver-to-spleen attenuation estimation. As can be seen by scatter plot 704 and Bland Altman graph 706, the slice-based automatic liver-to-spleen estimation achieved a Pearson correlation coefficient $\rho=0.95$.

FIG. 7C illustrates some embodiments of a scatter plot 708 and a Bland Altman graph 710 showing variability in a volume-based liver attenuation estimation. As can be seen by scatter plot 708 and Bland Altman graph 710, the volume-based automatic liver estimation achieved a Pearson correlation coefficient $\rho=0.96$.

FIG. 7D illustrates some embodiments of a scatter plot 712 and a Bland Altman graph 714 showing variability in a volume-based liver-to-spleen attenuation estimation. As can be seen by scatter plot 712 and Bland Altman graph 714, the volume-based automatic liver-to-spleen attenuation estimations achieved a Pearson correlation coefficient of $\rho=0.92$.

Figures 8, 9:
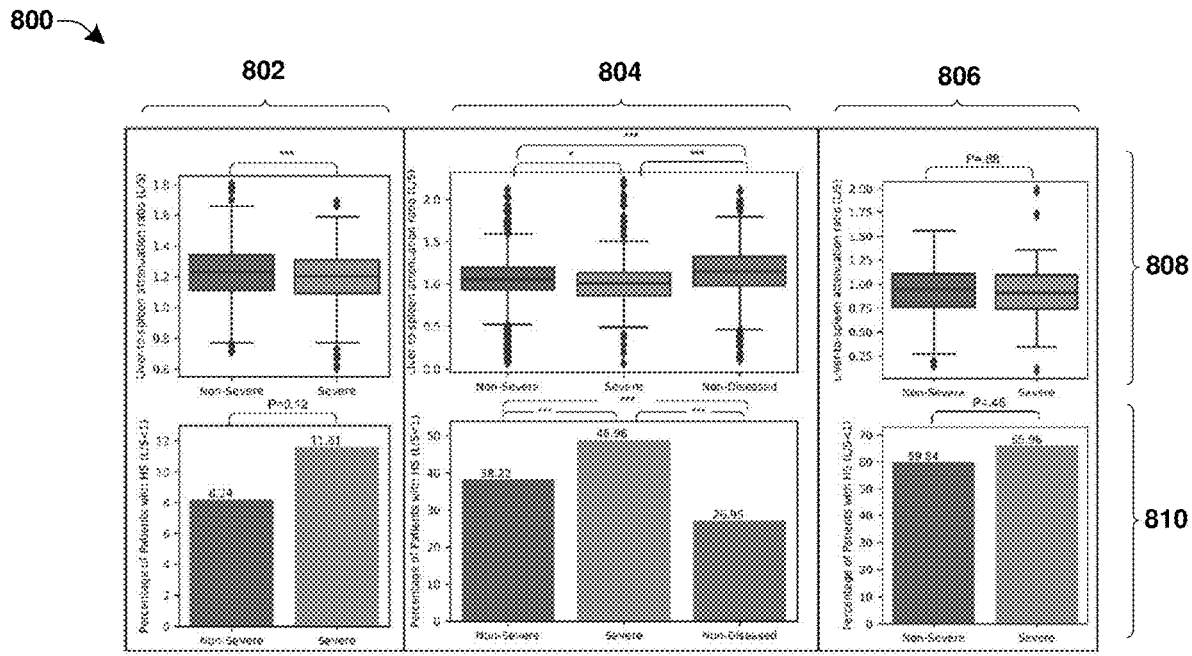
FIG. 8 illustrates bar graphs showing exemplary associations between COVID-19 infection severity and liver-to-spleen attenuation and hepatic steatosis.
FIG. 9 illustrates a table showing exemplary odds ratios between COVID-19 infection severity and hepatic steatosis.

FIG. 8 illustrates bar graphs 800 showing exemplary associations between COVID-19 infection severity and liver-to-spleen attenuation and hepatic steatosis.

The bar graphs 800 show associations between hepatic steatosis and COVID-19 infection for different data sets 802-806. Within the different data sets 802-806, first bar graphs 808 shows a mean liver-to-spleen attenuation ratio for patients with non-severe COVID and for patients with severe COVID. As can be seen by the first bar graphs 808, patients having severe covid have a lower liver-to-spleen attenuation ratio.

Within the different data sets, second bar graphs 810 shows a percentage of patients with hepatic steatosis (e.g., liver-to-spleen attenuation ratio<approximately 1) in non-severe COVID cases and in severe COVID cases. As can be seen by the second bar graphs 810, a higher percentage of patients with hepatic steatosis experience severe COVID than patients without hepatic steatosis.

Therefore, from the bar graphs shown in FIG. 8, it can be seen that both mean liver-to-spleen attenuation and hepatic steatosis are significant diagnostic indicators of patients that may experience severe symptoms in response to a COVID infection (e.g., an infection by the COVID-19 virus or a variant thereof).

FIG. 9 illustrates a table 900 showing exemplary odds ratios between COVID-19 infection severity and hepatic steatosis.

Table 900 shows an odds ratio (OR) for three different data sets D1-D3 along with an overall tally illustrating cumulative results of the different data sets. Each of the three different data sets D1-D3 contain patients that have hepatic steatosis. The OR is a measure of association between an exposure to a COVID 19 virus and severe COVID symptoms. In other words, an odds ratio of greater than 1 indicates that patients with hepatic steatosis are more likely to experience severe infections than non-severe infections. Because the odds ratio is greater than 1 in all of the data sets D1-D3, exposure to a COVID 19 virus is positively associated with higher odds of severe COVID symptoms for patients having hepatic steatosis. In some embodiments, the disclosed medical diagnostic tool may achieve an odds ratio of approximately 1.5 total over the three different data sets D1-D3. Therefore, the odds ratio shown in FIG. 9 illustrate a correlation between hepatic steatosis and experiencing severe symptoms in response to a COVID infection.

Figure 10:
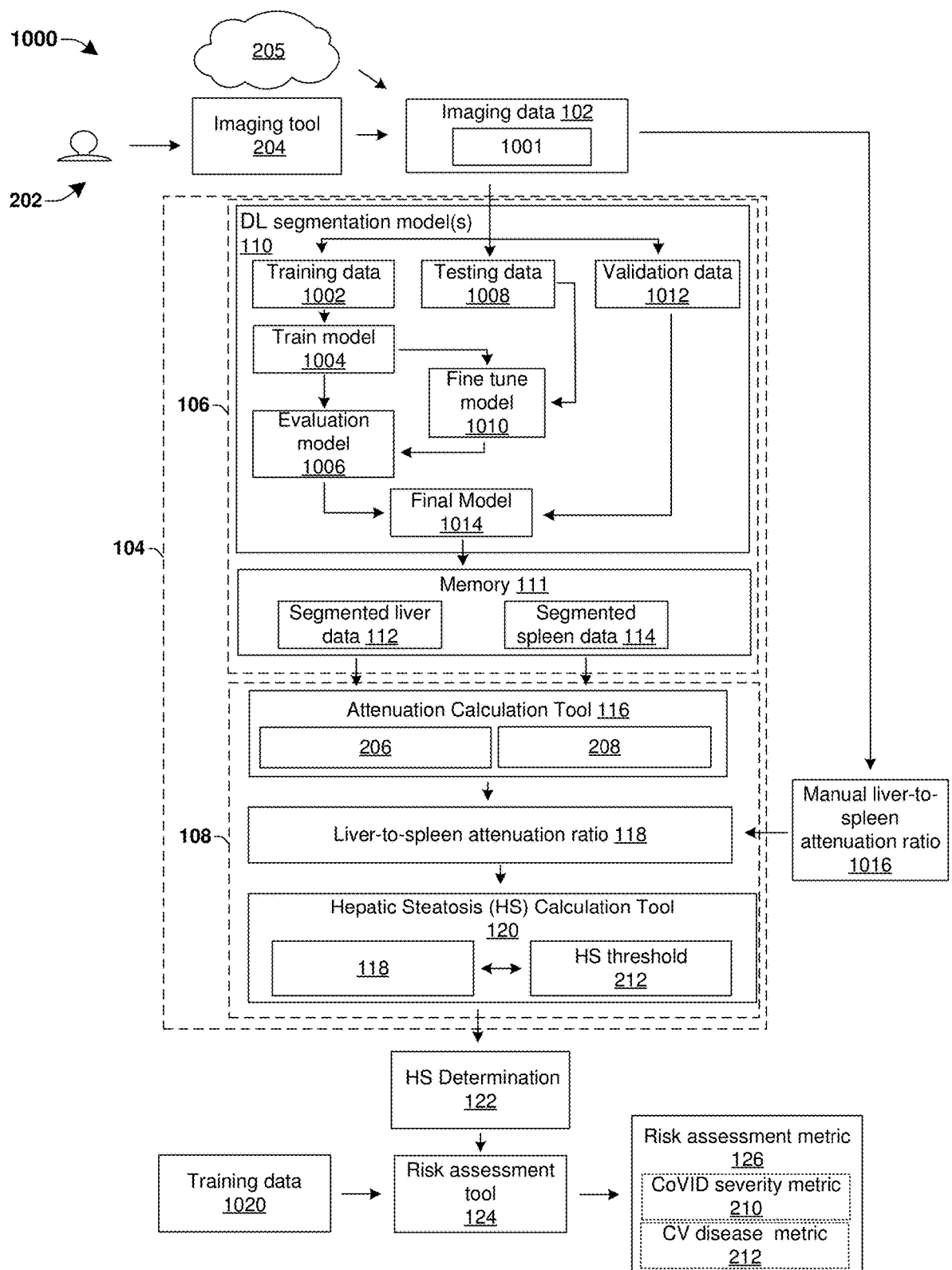
FIG. 10 illustrates a block diagram of some additional embodiments of a medical diagnostic tool comprising a disclosed deep learning hepatic fat pipeline.

FIG. 10 illustrates a block diagram of some additional embodiments of a medical diagnostic tool 1000 comprising a disclosed deep learning hepatic fat pipeline.

The medical diagnostic tool 1000 comprises a deep learning hepatic fat pipeline 104 having a first stage 106 including one or more deep learning segmentation models 110 configured to segment imaging data 102 to generate automatically segmented liver data 112 and automatically segmented spleen data 114. In various embodiments, the imaging data 102 may comprise digitized images of a liver and a spleen of a patient 202 obtained from one or more of an imaging tool 204 and an on-line data base 205. In some embodiments, the one or more deep learning segmentation models 110 comprise a single deep learning model that segments both the liver and the spleen. In other embodiments, the one or more deep learning segmentation models 110 comprise a first deep learning model that segments imaging data of the liver and a second deep learning model that segments imaging data of the spleen.

The deep learning hepatic fat pipeline 104 further comprises a second stage 108 that is configured to utilize the automatically segmented liver data 112 and the automatically segmented spleen data 114 to determine a liver-to-spleen attenuation ratio 118 and to further generate a hepatic steatosis determination 122 corresponding to the patient 202 from the liver-to-spleen attenuation ratio 118.

The second stage 108 comprises an attenuation calculation tool 116 that is configured to utilize the automatically segmented liver data 112 and the automatically segmented spleen data 114 to determine the liver-to-spleen attenuation ratio 118. In some embodiments, the attenuation calculation tool 116 is configured to utilize the automatically segmented liver data 112 to determine a liver attenuation 210, to utilize the automatically segmented spleen data 114 to determine a spleen attenuation 212, and to utilize the liver attenuation 210 and the spleen attenuation 212 to determine the liver-to-spleen attenuation ratio 118.

A hepatic steatosis (HS) calculation tool 120 is configured to generate a hepatic steatosis determination 122 from the liver-to-spleen attenuation ratio 118. In some embodiments, a risk assessment tool 124 may be configured to utilize the hepatic steatosis determination 122 to determine one or more risk assessment metrics 126. In some embodiments, the one or more risk assessment metrics 126 may comprise a COVID severity metric 216, which indicates how the patient 202 will respond to the COVID-19 virus. In other embodiments, the one or more risk assessment metrics 126 may comprise a cardiovascular disease metric 218, which indicates a likelihood that the patient 202 will develop cardiovascular disease.

In some embodiments, the one or more deep learning segmentation models 110 are trained and validated using a training data set 1001. In some embodiments, the training data set 1001 may comprise low-dose CAC CTs (e.g., 129 CAC CTs). In some embodiments, the low-dose CAC CTs used in training may include an entire liver and/or spleen. In some embodiments, one or more of the low-dose CAC CTs used in training do not include an entire liver and/or spleen.

The training data set 1001 may be broken into training data 1002, testing data 1008, and validation data 1012. The training data 1002 may be used to train initial versions 1004 of the one or more deep learning segmentation models. The initial versions 1004 of the one or more deep learning segmentation models may be subsequently fine-tuned 1010 using the testing data 1008 to generate one or more evaluation models 1006. The validation data 1012 may then be used to generate a final version 1014 of the one or more deep learning segmentation models from the one or more evaluation models 1006. In some embodiments, the one or more deep learning segmentation models 110 may comprise multiple convolutional neural network-based segmentation models trained with random 80 low-dose CAC CT scans and evaluated for their accuracy on the remaining 49 independent validation CAC CTs.

In some embodiments, a performance of the one or more deep learning segmentation models 110 may be evaluated based on the dice similarity coefficient (DSC) (e.g., a spatial overlap index that ranges from 0 to 1, with 0 indicating no spatial overlap and 1 representing the total overlap between the predicted and ground truth segmentations). A best performing model (e.g., a 3D residual-UNet architecture from nnUnet framework) may be identified from the DSC and then trained for 1000 epochs using 3D image patches of size=(28, 256, 256) and batch=2. In some embodiments, the best performing model may be trained de novo (e.g., without any pretraining) with 5-fold cross-validation.

In some embodiments, the attenuation calculation tool 116 and/or the risk assessment tool 124 may also be trained. In some embodiments, the attenuation calculation tool 116 may be compared with a manually calculated liver-to-spleen attenuation ratio 1016 generated by an expert pathologist. In some embodiments, the risk assessment tool 124 may be trained using a large set of training data 1020. For example, the risk assessment tool 124 may be trained to determine an association between hepatic steatosis and a severity of COVID-19 infections based upon training data 1020 from a large multi-site cohort of patients (e.g., having 805 patients from a first site, 1917 patients from a second site, and 169 patients from a third site).

Figure 11A:
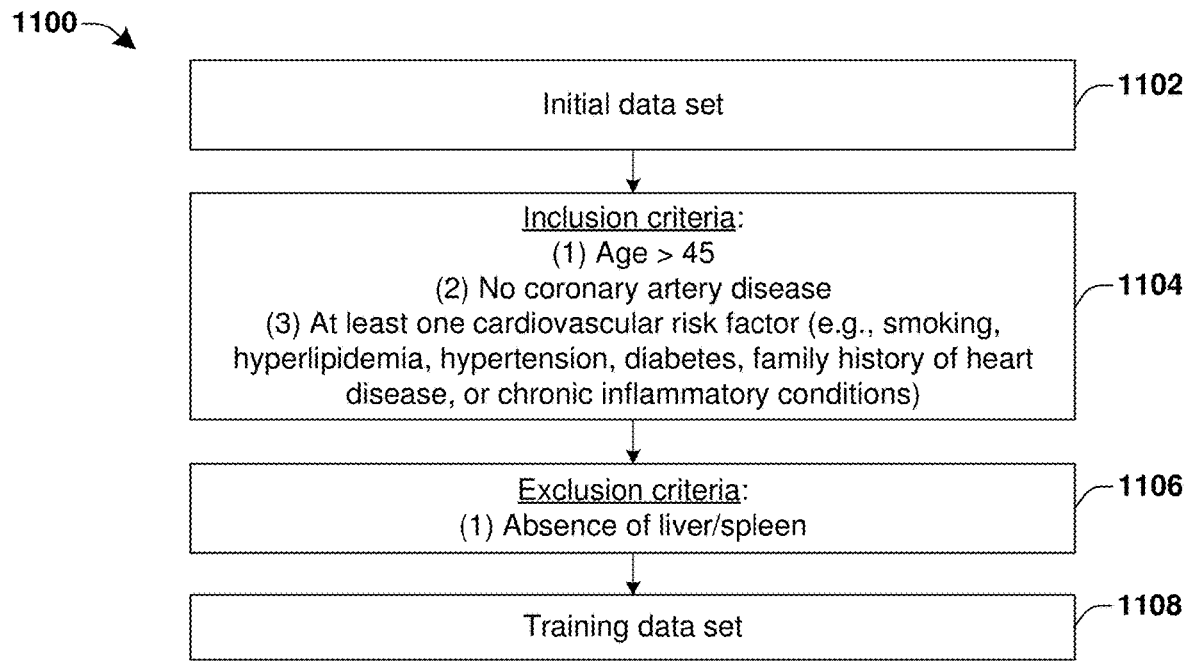
FIGS. 11A-11B illustrate example flow charts showing inclusion and exclusion criteria for training a disclosed deep learning hepatic fat pipeline.
Figure 11B:
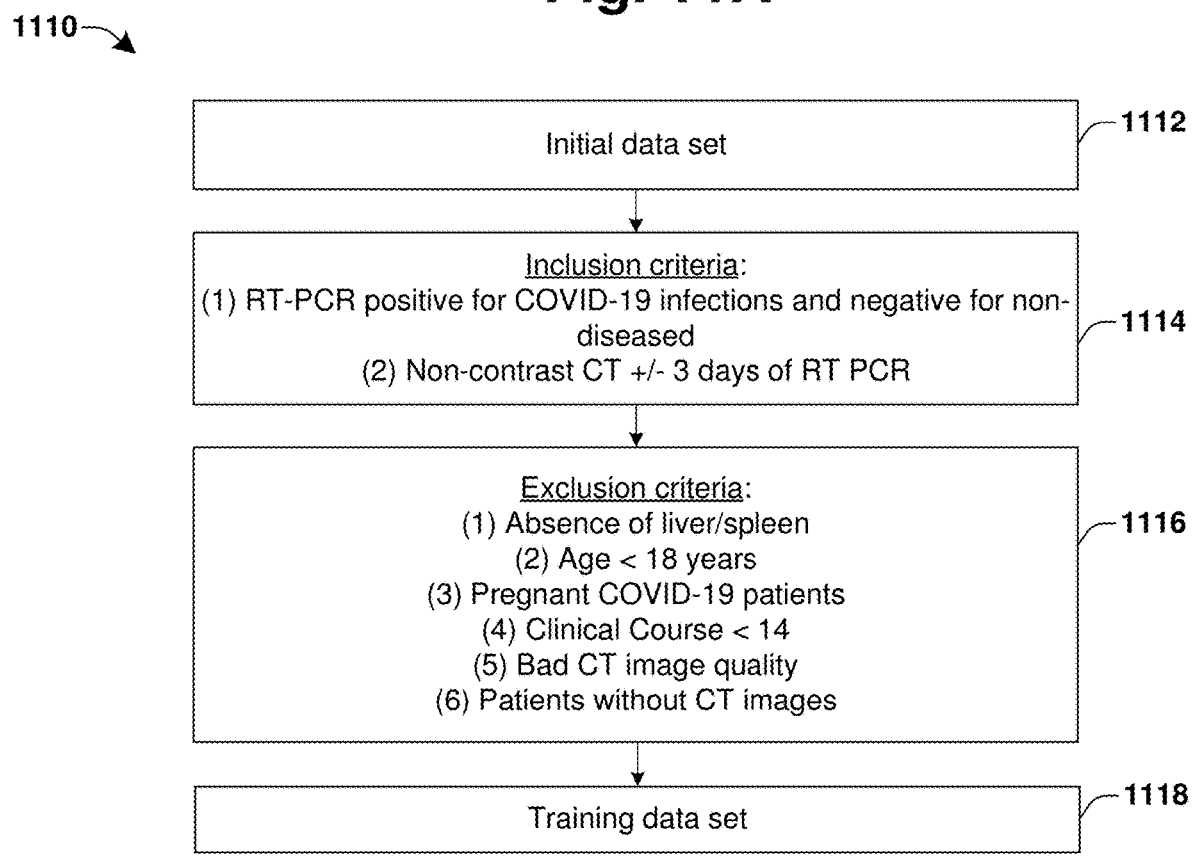

In some embodiments, the training data 1020 may be subject to one or more inclusion constraints and/or one or more exclusion constrains. FIGS. 11A-11B illustrates some exemplary inclusion constraints and/or exclusion constrains that may be applied to training data used in training the disclosed segmentation model.

FIG. 11A illustrates an example flow chart 1100 showing inclusion and exclusion criteria for training a disclosed deep learning pipeline to assess cardiometabolic risk.

As shown in FIG. 11A, an initial data set 1102 may be formed to comprise a first plurality of images. The initial data set 1102 is filtered according to a set of inclusion criteria 1104 and a set of exclusion criteria 1106 to generate a training set 1108. In some embodiments, the inclusion criteria 1104 may include that a patient associated with an image: is older than 45 years old, does not have coronary artery disease, has one or more cardiovascular risk factor (e.g., smoking, hyperlipidemia, hypertension, diabetes, family history of heart disease, or chronic inflammatory conditions). In some embodiments, the exclusion criteria 1106 may include that a patient associated with an image does not have a liver and/or spleen Images from the initial data set 1102 that fail to meeting either the set of inclusion criteria 1104 or the set of exclusion criteria 1106 are discarded and do not become part of the training set 1108. For example, an image associated with a patient that is 40 years old will be discarded as it fails to meeting one of the set of inclusion criteria 1104.

FIG. 11B illustrates an example flow chart 1110 showing inclusion and exclusion criteria for training the disclosed deep learning pipeline to assess COVID-19 risk.

As shown in FIG. 11B, an initial data set 1112 may be formed to comprise a first plurality of images. The initial data set 1112 is filtered according to a set of inclusion criteria 1114 and a set of exclusion criteria 1116 to generate a training data set 1118. Images from the initial data set 1112 that fail to meeting either the set of inclusion criteria 1114 or the set of exclusion criteria 1116 are discarded and do not become part of the training data set 1118.

In some embodiments the inclusion criteria 1114 may include that a patient associated with an image: has tested positive to a COVID test (e.g., a real time polymerase chain reaction (RT-PCT) test) and negative for non-diseased, and has had a non-contrast CT scan within three days of the positive COVID test. In some embodiments, the set of exclusion criteria 1116 may include that a patient associated with an image: has an absence of a liver and/or spleen, is less than 18 years old, is pregnant, has had a clinical course for treatment of COVID lasting less than 14 days, has CT scans with a bad image quality, does not have CT scans.

It will be appreciated that the disclosed methods and/or block diagrams may be implemented as computer-executable instructions, in some embodiments. Thus, in one example, a computer-readable storage device (e.g., a non-transitory computer-readable medium) may store computer executable instructions that if executed by a machine (e.g., computer, processor) cause the machine to perform the disclosed methods and/or block diagrams. While executable instructions associated with the disclosed methods and/or block diagrams are described as being stored on a computer-readable storage device, it is to be appreciated that executable instructions associated with other example disclosed methods and/or block diagrams described or claimed herein may also be stored on a computer-readable storage device. In some embodiments, the computer-executable instructions may be implemented within a software package, so as to allow a health care professional to utilize the disclosed methods and/or block diagrams through the software package.

Figure 12:
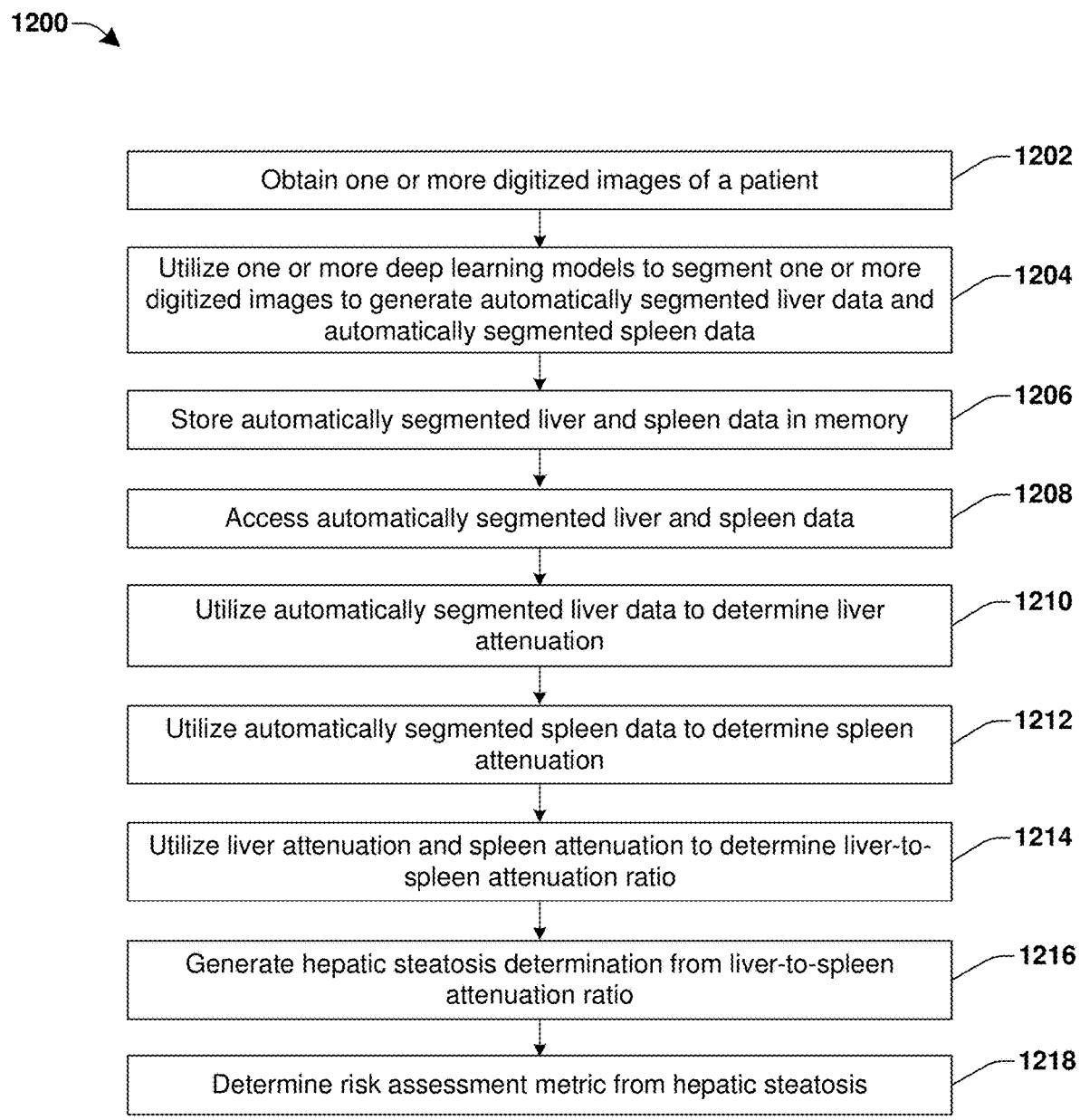
FIG. 12 illustrates a flow diagram of some embodiments of a method of assessing medical risk based upon a hepatic steatosis determination automatically generated from one or more digitized images.

FIG. 12 illustrates a flow diagram of some embodiments of a method 1200 of assessing medical risk based upon a hepatic steatosis determination automatically generated from one or more digitized images.

While the disclosed method 1200 is illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 1202, one or more digitized images of a patient are obtained. In some embodiments, the one or more digitized images may comprise low-dose non-contrast CT images. In some embodiments, the CT images may be obtained by positioning a patient within a gantry of a multidetector computer tomography (MDCT) scanner in a supine position. During a single breath-hold, images of a heart, from the level of the tracheal bifurcation to below the base of the heart, were acquired using prospective ECG triggering at 50-80% of the RR-interval, depending on the heart rate. Scan parameters may include 16×1.5 mm collimation, 205 mm field of view (FOV), variable rotation time (scanner specific), 120 kVp, and 40-70 mAs (based on weight).

At act 1204, one or more deep learning models are utilized to segment the one or more digitized image to generate automatically segmented liver data and automatically segmented spleen data.

At act 1206, the automatically segmented liver data and the automatically segmented spleen data is stored in a memory.

At act 1208, the automatically segmented liver data and the automatically segmented spleen data is accessed.

At act 1210, the automatically segmented liver data is used to determine a liver attenuation.

At act 1212, the automatically segmented spleen data is used to determine spleen attenuation.

At act 1214, a liver-to-spleen attenuation ratio is determined using the liver attenuation and the spleen attenuation.

At act 1216, a hepatic steatosis determination is generated from the liver-to-spleen attenuation ratio.

At act 1218, one or more risk assessment metrics are determined from the hepatic steatosis determination. In various embodiments, the one or more risk assessment metrics may correspond to a risk of cardiovascular disease, COVID severity, and/or the like.

Figure 13:
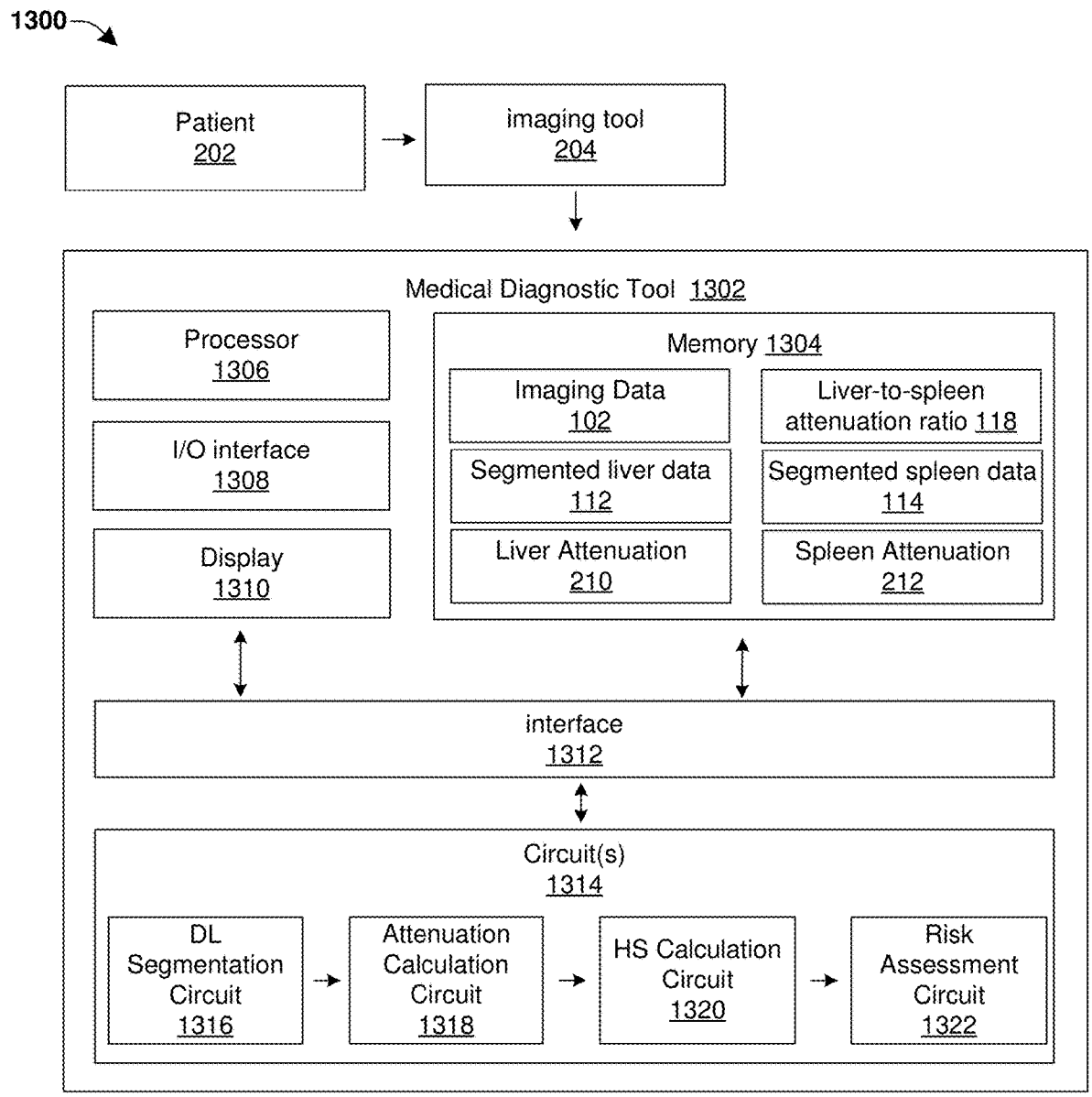
FIG. 13 illustrates a block diagram of some embodiments of a medical diagnostic tool comprising a disclosed deep learning hepatic fat pipeline.

FIG. 13 illustrates a block diagram of some embodiments of a medical diagnostic system 1300 comprising a disclosed deep learning hepatic fat pipeline.

The medical diagnostic system 1300 comprises a medical diagnostic tool 1302. The medical diagnostic tool 1302 is coupled to an imaging tool 204 (e.g., non-contrast CT imaging tool) that is configured to generate one or more digitized images (e.g., low-dose non-contrast images) of a patient 202.

The medical diagnostic tool 1302 comprises a processor 1306 and a memory 1304. The processor 1306 can, in various embodiments, comprise circuitry such as, but not limited to, one or more single-core or multi-core processors. The processor 1306 can include any combination of general-purpose processors and dedicated processors (e.g., graphics processors, application processors, etc.). The processor 1306 can be coupled with and/or can comprise memory (e.g., memory 1304) or storage and can be configured to execute instructions stored in the memory 1304 or storage to enable various apparatus, applications, or operating systems to perform operations and/or methods discussed herein.

Memory 1304 can be further configured to store imaging data 102 comprising the one or more digitized images (e.g., non-contrast digitized images) obtained by the imaging tool 204. The one or more digitized images may comprise a plurality of pixels, each pixel having an associated intensity. In some additional embodiments, the one or more digitized images may be stored in the memory 1304 as one or more training sets of digitized images for training a classifier and/or one or more validation sets (e.g., test sets) of digitized images.

The medical diagnostic tool 1302 also comprises an input/output (I/O) interface 1308 (e.g., associated with one or more I/O devices), a display 1310, one or more circuits 1314, and an interface 1312 that connects the processor 1306, the memory 1304, the I/O interface 1308, the display 1310, and the one or more circuits 1314. The I/O interface 1308 can be configured to transfer data between the memory 1304, the processor 1306, the one or more circuits 1314, and external devices (e.g., imaging tool 204).

In some embodiments, the one or more circuits 1314 may comprise hardware components. In other embodiments, the one or more circuits 1314 may comprise software components. In such embodiments, the one or more circuits 1314 may execute code stored in the memory 1304. The one or more circuits 1314 can comprise a deep learning segmentation circuit 1316 configured to perform a segmentation operation on one or more digitized images within the imaging data 102 to generate automatically segmented liver data 112 and automatically segmented spleen data 114. In some additional embodiments, the deep learning segmentation circuit 1316 may be configured to segment the one or more digitized images to generate binary masks comprising the automatically segmented liver data 112 and the automatically segmented spleen data 114, which may be stored in the memory 1304.

In some additional embodiments, the one or more circuits 1314 may further comprise an attenuation calculation circuit 1318 configured to generate a liver attenuation 210 and a spleen attenuation 212. In some embodiments, the liver attenuation 210 may be generated by measuring a mean value of Hounsfield units (HUs) over an entirety of the liver. In some embodiments, the spleen attenuation 212 may be generated by measuring a mean value of HUs over an entirety of a spleen. In some embodiments, the attenuation calculation circuit 1318 may further generate a liver-to-spleen attenuation ratio 118. In such embodiments, the liver-to-spleen attenuation ratio 118 may be generated by dividing the liver attenuation 210 by the spleen attenuation 212.

In some embodiments, the one or more circuits 1314 may further comprise a hepatic steatosis calculation circuit 1320 configured to generate a hepatic steatosis determination based upon the liver attenuation 210, the spleen attenuation 212, and/or the liver-to-spleen attenuation ratio 118. In some embodiments, the one or more circuits 1314 may further comprise a risk assessment circuit 1322 configured to generate one or more risk assessments from the hepatic steatosis determination.

Example Use Case 1

Methods

Inclusion and Exclusion Criteria for Cohort Construction:

CAC CTs: We obtained a convenience sample of 129 anonymized CTs done for CAC assessment as part of clinical care at University Hospitals in Cleveland, OH, between January 2014 and December 2020. Participants were at least 45 years of age with no known coronary artery disease and at least one cardiovascular risk factor (e.g., smoking, hyperlipidemia, hypertension, diabetes, family history of heart disease, or chronic inflammatory conditions). CTs were acquired using a standardized protocol. Subjects were positioned within the gantry of the MDCT scanner in the supine position. During a single breath-hold, images of the heart, from the level of the tracheal bifurcation to below the base of the heart, were acquired using prospective ECG triggering at 50-80% of the RR-interval, depending on the heart rate. Scan parameters: 16×1.5 mm collimation, 205 mm field of view (FOV), variable rotation time (scanner specific), 120 kVp, and 40-70 mAs (based on weight).

COVID-19 CTs: Following the inclusion and exclusion criteria, we additionally obtained non-contrast chest CTs from 805 patients with COVID-19 infections admitted to Renmin Hospital of Wuhan University, Hubei General Hospital (D1). Another cohort used for the study was the STOIC2021-COVID-19 AI Challenge dataset (D2), containing non-contrast chest CTs from 1917 patients suspected of being infected with COVID-19 during the first wave of the pandemic in France. The third cohort used for the study was the Stony Brook University COVID-19 Positive Cases dataset (D3), which contains non-contrast chest CTs from 169 patients who tested positive for COVID-19. Patients were categorized into two groups based on the disease severity: severe (requiring invasive mechanical ventilation, extracorporeal membrane oxygenation, or death) vs non-severe (no invasive ventilator support (no respiratory distress, oxygen supplementation, non-invasive ventilation). Altogether, three different cohorts of patients—D1, N=805 (465 severe and 340 non-severe); D2, N=1917 (288 severe, 887 non-severe, and 742 non-diseased); D3, N=169 (47 severe and 122 non-severe)—were used to explore the association between automated HS quantification by the disclosed hepatic fat deep learning pipeline with clinical severity of COVID-19 infections.

Data Annotation and ROI Measurements

For each CT, a trained expert—with ten years of cardiac CT segmentation experience—performed manual segmentation and manual ROI-based CT attenuation measurements on CAC CTs. For segmentation, the expert performed manual demarcation of the liver and spleen on all slices using 3D Slicer software. For the manual ROI-based CT attenuation measurements, circular ROI measuring 5-10 cm2 were placed at different locations (three on the liver and one in the spleen), avoiding vasculature, cysts, blood vessels, bile ducts, calcification, and other heterogeneous areas. The liver-to-spleen attenuation ratio was obtained by dividing the mean Hounsfield units (HU) across the 3 ROIs in the liver by the mean HU of the spleen ROI as previously described. The manual ROI-based measurements were performed on 49 anonymized validation scans. The same expert was asked to perform the repeated measurement on the same set of cases (after a washout period of a month) for intra-reader variability analysis. The human expert performed all these ROI-based measurements without knowing the automated results of the liver and liver-to-spleen attenuation ratio.

Deep-Learning-Based Hepatic Fat Estimation:

The hepatic fat deep learning pipeline is a two-stage method; first, a deep-learning-based model is presented to segment the entire imaged liver and spleen. Second, CT attenuation is measured on the imaged organ using the disclosed hepatic fat deep learning pipeline. Additional details are provided below.

Deep-Learning-Based Liver and Spleen Segmentation:

We utilized low-dose CAC CTs (N=129) to train and validate the deep-learning-based segmentation models to segment the liver and spleen. We trained four state-of-the-art, convolutional neural network-based segmentation models with random 80 low-dose CAC CT scans and evaluated their accuracy on the remaining 49 independent validation CAC CTs. The performance of these models was compared based on the dice similarity coefficient (DSC). DSC is a spatial overlap index that ranges from 0 to 1, with 0 indicating no spatial overlap and 1 representing the total overlap between the predicted and ground truth segmentations. The best performing model (3D residual-UNet architecture from nnUnet framework) was trained for 1000 epochs using 3D image patches of size=(28, 256, 256) and batch=2. The model was trained de novo (i.e., without any pretraining) with 5-fold cross-validation. We employed an Nvidia Tesla V100 GPU with 32 GB memory to train the model. The model training took a total of 43 hours of computation on the GPU. The final trained model took ~1 minute to segment the liver and spleen for each patient.

CT Attenuation Measurement

The disclosed hepatic fat deep learning pipeline employed two methods of measuring the CT attenuation automatically: slice-based and volumetric-based. In a slice-based estimation, the disclosed hepatic fat deep learning pipeline identifies the slice with the maximum area and obtain the mean attenuation and standard deviation across that slice. In a volumetric-based estimation of liver and liver-to-spleen attenuation, the disclosed hepatic fat deep learning pipeline considers the whole liver and spleen for the measurement, and the ratio of mean HU for liver and spleen is obtained. The mean liver and mean liver-to-spleen CT attenuation are estimated using both methods and compared with manual ROI-based measurement performed by the expert. We considered the average of the two intra-measurements done by the expert as the reference measurement.

Statistical Analysis

The Pearson correlation coefficient (p) was used to measure the linear association of the disclosed hepatic fat deep learning pipeline based liver/liver-to-spleen attenuation estimation with manual ROI-based measurement by the human expert. Bland-Altman plots were presented to evaluate the agreement between the two measurement methods. We used a t-test to determine if there is a statistically significant difference between the mean liver/liver-to-spleen attenuation of severe vs non-severe COVID-19 patients' group. Further, a two-proportions z-test was used to compare the proportions of patients with HS (liver-to-spleen attenuation ratio <1) in the severe and non-severe COVID-19 infections group. A meta-analysis was performed to estimate the pooled association between HS and severe COVID19 infection. We used Python (3.7.0) with the SciPy (1.5.2) package for statistical analyses. A P-value of less than 0.05 indicated statistical significance. P-values less than 0.05, 0.01, and 0.001 are marked with one, two, and three asterisks, respectively.

Results

In the hold-out validation CAC cohort (N=49), the attenuation (mean±standard deviation) of the liver and spleen was 48.46±11.30 and 42.96±7.33, respectively. The mean liver-to-spleen attenuation was 1.17±0.38. There was a strong correlation for intra-reader variability of the liver, spleen, and liver-to-spleen attenuation measurements (0.94, 0.80, and 0.85, respectively). The mean of the liver attenuation was 48.14±11.40 and 48.78±11.52 (P=0.12) during the intra-reader measurements by the human expert. The intra-reader mean of the spleen attenuation was 43.79±8.01 and 42.12±7.43 (P=0.01), respectively. Similarly, the liver-to-spleen attenuation was 1.15±0.41 and 1.20±0.38 (P=0.06), respectively. Bland Altman graphs revealed that the bias (i.e., the mean difference between two measurements by the expert) for liver, spleen and liver-to-spleen attenuation were −0.64, 1.67, and −0.05, whereas the 95% limits of agreement range were −8.03 to 6.76, −7.81 to 11.15, and −0.49 to 0.38, respectively. The scatter plots suggest the lack of a consistent bias in the two measurements (intra-reader) by the expert.

All trained deep-learning-based segmentation models had excellent performance with DSC between 0.94-0.95 (refer to FIG. 13). The best performing model (3D residual-UNet architecture from nnUnet framework) achieved a DSC of 0.95, 95% CI [0.93-0.96] on the hold-out validation set and was used for measuring CT attenuation. The performance of the CT attenuation measurement methods is illustrated in FIG. 14. With ground truth segmentation (performed manually by the expert), a strong correlation was found between slice-based liver and liver-to-spleen attenuation estimation with manual ROI-based measurement (Pearson correlation coefficient $\rho=0.97$ and $\rho=0.94$, respectively). Similarly, volume-based liver and liver-to-spleen attenuation estimation achieved a Pearson correlation coefficient of $\rho=0.93$ and $\rho=0.89$ with manual ROI-based measurement, respectively. With the segmentation obtained using the disclosed hepatic fat deep learning pipeline, slice-based automatic liver and liver-to-spleen attenuation estimation had a significant association with manual ROI-based measurement (Pearson correlation coefficient $\rho=0.98$ and rho=0.95, respectively,). With manual ROI-based liver and liver-to-spleen attenuation estimations, volume-based automatic liver and liver-to-spleen attenuation estimations achieved a Pearson correlation coefficient $\rho=0.96$ and $\rho=0.92$, respectively. When compared to ground truth segmentation, the mean liver and mean liver-to-spleen CT attenuation estimation with nnUnet segmentation had a better correlation with manual ROI-based measurement.

Out of the 805 patients in the dataset (D1) with COVID-19 infections, 465 had severe infections, and 340 had non-severe infections. The disclosed hepatic fat deep learning pipeline liver-to-spleen attenuation ratio (1.19±0.17 vs. 1.23±0.18, P=0.001) were lower in severe vs. non severe COVID-19 patients. When categorized using traditional definitions of HS (liver-to-spleen attenuation ratio <1), patients with severe COVID-19 had a higher percentage of HS compared with non-severe COVID-19 infections (11.61% vs 8.24%, P=0.12), refer to FIG. 10a. The odds ratio (OR) was 1.46, 95% CI [0.9-2.36] (refer to FIG. 15). Similar observations were obtained with the dataset (D2, N=1917) and (D3, N=169). In the D2 dataset, the disclosed hepatic fat deep learning pipeline based-liver-to-spleen attenuation ratio (1.01±0.31 vs. 1.05±0.27, P=0.03) was lower in severe (N=288) vs. non-severe (N=887) COVID-19 patients. We also compared them with non-diseases control patients (N=742). We found that the liver-to-spleen attenuation ratio (1.15±0.30) was higher in the non-diseases control group compared to the severe (P<0.001) and non-severe COVID-19 (P<0.001) groups. We also found that patients with severe COVID-19 had a significantly higher percentage of HS compared with non-severe COVID-19 infections (48.96% vs 38.22%, P=0.001) with OR=1.55, 95% CI [1.19-2.02]). The non-diseased control patients had a lower percentage of HS, with non-severe (26.95% vs. 38.22%, P<0.001, OR=2.60, 95% CI [1.96-3.45]) and severe (26.95% vs. 48.96%, P<0.001, OR=1.67, 95% CI [1.35-2.07]) COVID-19 infections. In D3, the disclosed hepatic fat deep learning pipeline based liver-to-spleen attenuation ratio was (0.93±0.27 vs. 0.93±0.32, P=0.88) in severe (N=47) vs. non severe (N=122) COVID-19 patients. Similar findings hold for D3, where severe COVID-19 infections had a higher percentage of HS compared to non-severe COVID-19 infections (65.96% vs 59.84%, P=0.46, OR=1.30, 95% CI [0.64-2.63]). In a pooled fixed effect model including the 3 cohorts, HS was associated with increased odds for severe COVID19 infection (pooled OR 1.50, 95% CI [1.20-1.88], P<0.001).

DISCUSSION

In this work, we presented a fully automatic hepatic fat deep learning pipeline to segment the liver and spleen on non-contrast computed tomography (CT) performed for coronary artery calcium (CAC) in an attempt to evaluate whole-volume liver and spleen attenuation and HS. The disclosed hepatic fat deep learning pipeline was also applied to large multi-site cohorts of COVID-19 patients to investigate if the severe COVID-19 infections were associated with lower hepatic attenuation values, in turn reflecting HS.

Liver segmentation is an essential task in medical image analysis, and various benchmarks/challenges for liver segmentation have been organized thus far. The best liver segmentation algorithm has reported a DSC of 0.96. The public/challenge CT datasets for liver and spleen segmentations are near-universally performed on contrast-enhanced CT scans, while CAC scans are low-dose non-contrast CTs (thick slabs of 2.5 mm). The performance of these models is relatively poor on these low-dose non-contrast CTs. In our disclosure, we trained state-of-the-art deep-learning-based segmentation models on low-dose non-contrast CTs and achieved a DSC of 0.95, 95% CI [0.93-0.96] on the independent validation set (N=49).

In a multi-stage algorithm, the effectiveness of the preceding stage affects the performance of the subsequent downstream analyses. Therefore, we evaluated the performance of these CT attenuation measurement methods on the segmentation obtained by the disclosed hepatic fat deep learning pipeline and compared it with ground truth segmentation (performed manually by the expert). Our results suggest that the CT attenuation estimations with the disclosed hepatic fat deep learning pipeline yielded a strong correlation with manual ROI-based measurement similar to the ground truth segmentation. Overall, the results suggest that slice and volumetric-based estimations via the disclosed hepatic fat deep learning pipeline were highly correlated with human reader assessment. Unlike other approaches, the disclosed hepatic fat deep learning pipeline does not need an expert to manually segment the liver or estimate liver fat.

We additionally utilized the disclosed hepatic fat deep learning pipeline to investigate the prevalence of HS (liver-to-spleen attenuation ratio <1 in CT) in patients with severe COVID-19 infections compared to non-severe COVID-19 infections. We found that the patients with severe COVID-19 had a higher percentage of HS compared with non-severe COVID-19 infections across three different cohorts from three different institutions. These differences were statistically significant for D2, where P<0.05. The P-values were affected by sample size, effect size and other factors. As the sample size increases (D3, N=169; D1, N=805; D2, N=1917), the P-value decreases (D3, 0.46; D1, 0.12, D3, <0.001) due to reduction in the impact of random error. However, the effect sizes across three datasets were comparable (OR: D1=1.46, D2=1.55, and D3=1.30), with pooled OR 1.50, 95% CI [1.20-1.88] suggesting a higher odd of HS among patients with severe COVID-19 than in non-severe COVID-19 infections. We also observed a few outliers. On further investigation, we found that these outliers were either due to the image artifacts or due to the inclusion of a portion of the heart causing incorrect estimation of liver attenuation.

Our disclosure utilizes a deep-learning-based pipeline to investigate the association between HS and the severity of COVID-19 infections in a large cohort of patients. Our disclosure further suggests that liver steatosis assessment using the disclosed hepatic fat deep learning pipeline can be utilized as an automated, reproducible method to assess risk in COVID-19 infections. The scans used in training did not include the entire liver as they were intended for CAC screening, and thus it is not clear how our model might perform in scans that include the entirety of the liver/spleen. Secondly, volume-based liver attenuation can be biased by the presence of large cysts, masses, or calcifications that were not present in our training datasets.

Therefore, the present disclosure relates to a method and apparatus configured to assess a medical risk (e.g., for cardiometabolic disease, COVID-19 severity, etc.) based upon a hepatic steatosis determination automatically generated from a digitized image using a deep learning pipeline.

In some embodiments, the present disclosure relates to a method. The method includes accessing automatically segmented liver data and automatically segmented spleen data from a patient, the automatically segmented liver data including a region of interest from a digitized image of a liver and the automatically segmented spleen data including a region of interest from a digitized image of a spleen; utilizing the automatically segmented liver data to determine a liver attenuation; utilizing the automatically segmented spleen data to determine a spleen attenuation; determining a liver-to-spleen attenuation ratio from the liver attenuation and the spleen attenuation; and making a hepatic steatosis determination from the liver-to-spleen attenuation ratio.

In other embodiments, the present disclosure relates to a non-transitory computer-readable medium storing computer-executable instructions that, when executed, cause a processor to perform operations, including operating one or more deep learning models on one or more computed tomography (CT) images having a liver and a spleen, the one or more deep learning models being configured to segment the liver and generate automatically segmented liver data and to segment the spleen and generate automatically segmented spleen data; measuring a liver attenuation from the automatically segmented liver data; measuring a spleen attenuation from the automatically segmented spleen data; determining a liver-to-spleen attenuation ratio from the liver attenuation and the spleen attenuation; and generating a hepatic steatosis determination from the liver-to-spleen attenuation ratio.

In yet other embodiments, the present disclosure relates to an apparatus. The apparatus includes one or more deep learning models configured to operate upon one or more digitized images that include a liver and a spleen to generate automatically segmented liver data and automatically segmented spleen data; an attenuation calculation tool configured to utilize the automatically segmented liver data to measure a liver attenuation, to utilize the automatically segmented spleen data to measure a spleen attenuation, and to determine a liver-to-spleen attenuation ratio from the liver attenuation and the spleen attenuation; and a hepatic steatosis calculation tool configured to generate a hepatic steatosis (HS) determination by comparing the liver-to-spleen attenuation ratio to an hepatic steatosis threshold.

Examples herein can include subject matter such as an apparatus, a digital whole slide scanner, a CT system, an MRI system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method, comprising:
   accessing automatically segmented liver data and automatically segmented spleen data from a patient, wherein the automatically segmented liver data comprises a region of interest from a digitized image of a liver and the automatically segmented spleen data comprises a region of interest from a digitized image of a spleen;
   utilizing the automatically segmented liver data to determine a liver attenuation;
   utilizing the automatically segmented spleen data to determine a spleen attenuation;
   determining a liver-to-spleen attenuation ratio from the liver attenuation and the spleen attenuation; and
   making a hepatic steatosis determination from the liver-to-spleen attenuation ratio.

2. The method of claim 1, wherein the spleen attenuation and the liver attenuation are determined by a slice-based estimation method configured to identify a slice of the digitized image of the liver with a maximum liver area or a slice of the digitized image of the spleen with a maximum spleen area and to obtain a mean attenuation across an entire liver and an entire spleen within the slice.

3. The method of claim 1, wherein the spleen attenuation and the liver attenuation are determined by a volume-based estimation configured to obtain a mean attenuation across an entire liver and an entire spleen over a three-dimensional image volume.

4. The method of claim 1, wherein the liver-to-spleen attenuation ratio is obtained by:
   measuring a first mean value of Hounsfield units over an entirety of a segmented liver identified by the automatically segmented liver data;
   measuring a second mean value of Hounsfield units over an entirety of a segmented spleen identified by the automatically segmented spleen data; and
   dividing the first mean value of Hounsfield units by the second mean value of Hounsfield units to obtain the liver-to-spleen attenuation ratio.

5. The method of claim 1, further comprising:
   accessing one or more digitized images comprising a liver and a spleen;
   operating one or more deep learning models on the one or more digitized images to segment the liver and generate the automatically segmented liver data;
   operating the one or more deep learning models on the one or more digitized images to segment the spleen and generate the automatically segmented spleen data; and
   storing the automatically segmented liver data and the automatically segmented spleen data in an electronic memory.

6. The method of claim 5, wherein the one or more digitized images comprise low-dose non-contrast computed tomography (CT) images.

7. The method of claim 5, wherein the one or more deep learning models comprise a 3D residual-UNet architecture from nnUnet framework.

8. The method of claim 5, further comprising:
   training the one or more deep learning models on a plurality of computed tomography (CT) images.

9. The method of claim 8, wherein one or more of the plurality of CT images used in training do not include an entire liver.

10. The method of claim 1, further comprising:
    determining a risk assessment metric based on the hepatic steatosis determination, wherein the risk assessment metric corresponds to a severity of COVID symptoms that the patient is expected to experience due to a COVID infection; and
    assigning a care level to the patient based on the risk assessment metric.

11. A non-transitory computer-readable medium storing computer-executable instructions that, when executed, cause a processor to perform operations, comprising:
    operating one or more deep learning models on one or more computed tomography (CT) images comprising a liver and a spleen, wherein the one or more deep learning models are configured to segment the liver and generate automatically segmented liver data and to segment the spleen and generate automatically segmented spleen data;
    measuring a liver attenuation from the automatically segmented liver data;
    measuring a spleen attenuation from the automatically segmented spleen data;
    determining a liver-to-spleen attenuation ratio from the liver attenuation and the spleen attenuation; and
    generating a hepatic steatosis determination from the liver-to-spleen attenuation ratio.

12. The non-transitory computer-readable medium of claim 11, wherein the one or more deep learning models comprise a single deep learning model.

13. The non-transitory computer-readable medium of claim 11, wherein the operations further comprise:
    determining one or more risk assessment metrics based on the hepatic steatosis determination.

14. The non-transitory computer-readable medium of claim 13, wherein the one or more risk assessment metrics comprise one or more of a COVID severity metric and a cardiovascular disease metric.

15. The non-transitory computer-readable medium of claim 11, wherein the one or more CT images comprise low-dose non-contrast computed tomography images.

16. The non-transitory computer-readable medium of claim 11, wherein the spleen attenuation and the liver attenuation are determined by a slice-based estimation method configured to identify a slice of a digitized image with a maximum area and obtain a mean attenuation across an entire liver and an entire spleen within the slice.

17. The non-transitory computer-readable medium of claim 11, wherein the spleen attenuation and the liver attenuation are determined by a volume-based estimation configured to obtain a mean attenuation across an entire liver and an entire spleen over a three-dimensional image volume.

18. An apparatus, comprising:
- one or more deep learning models configured to operate upon one or more digitized images that include a liver and a spleen to generate automatically segmented liver data and automatically segmented spleen data;
- an attenuation calculation tool configured to utilize the automatically segmented liver data to measure a liver attenuation, to utilize the automatically segmented spleen data to measure a spleen attenuation, and to determine a liver-to-spleen attenuation ratio from the liver attenuation and the spleen attenuation; and
- a hepatic steatosis calculation tool configured to generate a hepatic steatosis (HS) determination by comparing the liver-to-spleen attenuation ratio to an hepatic steatosis threshold.

19. The apparatus of claim 18, wherein the one or more deep learning models are configured to generate one or more binary masks that include the automatically segmented liver data identifying a segmented liver and that include the automatically segmented spleen data identifying a segmented spleen.

20. The apparatus of claim 19, wherein the liver-to-spleen attenuation ratio is obtained by:
- measuring the liver attenuation as a first mean value of Hounsfield units over an entirety of the segmented liver;
- measuring the spleen attenuation as a second mean value of Hounsfield units over an entirety of the segmented spleen; and
- dividing the first mean value of Hounsfield units by the second mean value of Hounsfield units to obtain the liver-to-spleen attenuation ratio.

* * * * *